United States Patent
Van Wageningen et al.

(10) Patent No.: US 12,489,545 B2
(45) Date of Patent: Dec. 2, 2025

(54) EFFICIENT MODULATION CONTROL

(71) Applicant: SIGNIFY HOLDING B.V., Eindhoven (NL)

(72) Inventors: Andries Van Wageningen, Wijlre (NL); Johan Paul Marie Gerard Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 350 days.

(21) Appl. No.: 18/029,425

(22) PCT Filed: Oct. 4, 2021

(86) PCT No.: PCT/EP2021/077215
§ 371 (c)(1),
(2) Date: Mar. 30, 2023

(87) PCT Pub. No.: WO2022/073893
PCT Pub. Date: Apr. 14, 2022

(65) Prior Publication Data
US 2023/0336268 A1    Oct. 19, 2023

(30) Foreign Application Priority Data
Oct. 5, 2020   (EP) ..................................... 20199987

(51) Int. Cl.
*H04L 5/00* (2006.01)
*H04L 1/00* (2006.01)
(Continued)

(52) U.S. Cl.
CPC .......... *H04L 1/0003* (2013.01); *H04L 1/0009* (2013.01); *H04L 5/0046* (2013.01);
(Continued)

(58) Field of Classification Search
CPC ... H04L 1/0003; H04L 1/0009; H04L 5/0046; H04L 25/021; H04L 27/0008;
(Continued)

(56) References Cited

U.S. PATENT DOCUMENTS

2002/0071406 A1   6/2002   Bursztejn et al.
2007/0110176 A1*  5/2007   Wu ....................... H04L 5/0044
                                                    375/260

(Continued)

FOREIGN PATENT DOCUMENTS

EP       2850870 A1    3/2015
EP       2945307 A1   11/2015
(Continued)

OTHER PUBLICATIONS

3GPP TSG RAN WGI Meeting #85bis, Nanging, CN, May 23-27, 2016; CMCC, "Phase Noise in High Frequency Bands for New Radio Systems", R1-164888, 3 pages.

*Primary Examiner* — Lan-Huong Truong

(57) ABSTRACT

To fully enjoy the benefit of adaptive modulation or bit loading in a multi-carrier wireless communication system, a bit loading control method (700) is disclosed to reduce the system complexity and signaling overhead by making use of an attribute of the communication channel, which has a declining channel response with increasing frequency. Instead of applying adaptive bit loading on a per subcarrier basis, the disclosed method (700) obtains (S703) an estimated channel response based a test signa; and determines (S704) according to the estimated channel response a bit loading scheme for allocating the plurality of subcarriers into one or more non-overlapping frequency segments. For each frequency segment, an individual modulation scheme is assigned, which is shared by the more than one adjacent subcarrier comprised in the same frequency segment. The (Continued)

monotonicity of the channel response is used to accelerate the algorithm, as well as to make control information more compact.

15 Claims, 7 Drawing Sheets

(51) Int. Cl.
*H04L 25/02* (2006.01)
*H04L 27/00* (2006.01)
*H04L 27/26* (2006.01)

(52) U.S. Cl.
CPC ........ *H04L 25/021* (2013.01); *H04L 27/0008* (2013.01); *H04L 27/2602* (2013.01)

(58) Field of Classification Search
CPC ....... H04L 27/2602; H04L 1/24; H04L 5/006; H04W 24/08; H04W 72/00
See application file for complete search history.

(56) References Cited

U.S. PATENT DOCUMENTS

| | | | |
|---|---|---|---|
| 2007/0165832 A1* | 7/2007 | Insler | H04L 27/2601 379/350 |
| 2015/0263784 A1* | 9/2015 | Gacanin | H04B 3/36 375/211 |
| 2016/0233980 A1 | 8/2016 | Pantelias et al. | |

FOREIGN PATENT DOCUMENTS

| | | |
|---|---|---|
| EP | 3240303 A1 | 11/2017 |
| WO | 2013170908 A1 | 11/2013 |

* cited by examiner

Table 17-4—Modulation-dependent parameters
| Modulation | Coding rate (R) | Coded bits per subcarrier ($N_{BPSC}$) | Coded bits per OFDM symbol ($N_{CBPS}$) | Data bits per OFDM symbol ($N_{DBPS}$) | Data rate (Mb/s) (20 MHz channel spacing) | Data rate (Mb/s) (10 MHz channel spacing) | Data rate (Mb/s) (5 MHz channel spacing) |
|---|---|---|---|---|---|---|---|
| BPSK | 1/2 | 1 | 48 | 24 | 6 | 3 | 1.5 |
| BPSK | 3/4 | 1 | 48 | 36 | 9 | 4.5 | 2.25 |
| QPSK | 1/2 | 2 | 96 | 48 | 12 | 6 | 3 |
| QPSK | 3/4 | 2 | 96 | 72 | 18 | 9 | 4.5 |
| 16-QAM | 1/2 | 4 | 192 | 96 | 24 | 12 | 6 |
| 16-QAM | 3/4 | 4 | 192 | 144 | 36 | 18 | 9 |
| 64-QAM | 2/3 | 6 | 288 | 192 | 48 | 24 | 12 |
| 64-QAM | 3/4 | 6 | 288 | 216 | 54 | 27 | 13.5 |
FIG. 8
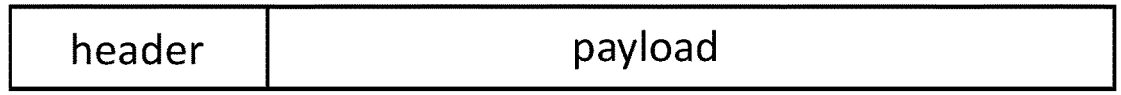
FIG. 9
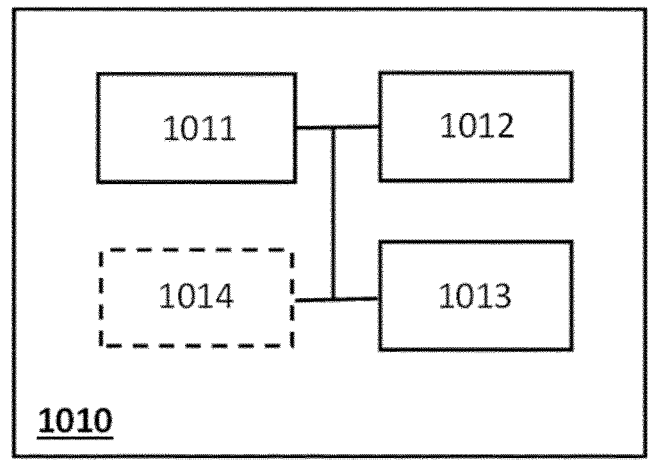
FIG. 10

EFFICIENT MODULATION CONTROL

CROSS-REFERENCE TO PRIOR APPLICATIONS

This application is the U.S. National Phase application under 35 U.S.C. § 371 of International Application No. PCT/EP2021/077215, filed on Oct. 4, 2021, which claims the benefit of European Patent Application No. 2019987.7, filed on Oct. 5, 2020. These applications are hereby incorporated by reference herein.

FIELD OF THE INVENTION

The invention relates to the field of physical (PHY) layer modulation control in a multi-carrier wireless communication system. More particularly, various methods, apparatus, systems, and computer-readable media are disclosed herein related to assist a pair of transmitter and receiver to carry out an adaptive modulation control method in an efficient manner.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over the wireless radio frequency communication make Li-Fi a promising solution to mitigate the pressure on the crowded radio spectrum for IoT applications. Other benefits of Li-Fi may include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad sense to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is similar, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

In many wireless communication systems, a frequency response of a communication channel is frequency dependent or frequency selective. In order to improve the capacity of the communication channel, adaptive modulation or adaptive bit loading over the channel is adopted, where the number of bits are assigned to each subcarrier depending on the channel characteristic of that subcarrier. If a first subcarrier is with better channel characteristics than a second subcarrier, a larger number of bits are to be assigned to the first subcarrier accordingly. For a multi-carrier wireless communication system, such as an orthogonal frequency-division multiplexing (OFDM) system, a conventional adaptive bit loading method assigns an optimum modulation scheme for each individual subcarrier such that the channel capacity is maximized.

SUMMARY OF THE INVENTION

Typically, a wireless channel may change rapidly due to the mobility of an end device, and therefore the adaptive modulation scheme may have to be updated frequently due to the dynamic frequency response of the channel. The computation complexity to derive an appropriate modulation scheme over the plurality of subcarriers and the overhead on signaling exchange in order to align between a pair of remote transmitter and receiver about the modulation scheme can be substantial, which may compromise the intention to improve the effective data throughput over the channel. Furthermore, the complexity and overhead to implement this method may also scale with the number of subcarriers.

In view of the above, the present disclosure is directed to methods, apparatus, systems, computer program and computer-readable media for providing a mechanism to support an adaptive bit loading control method between a transmitter and receiver pair in a multi-carrier wireless communication system. More particularly, the goal of this invention is achieved by a bit loading control method as claimed in claim 1, by a bit loading control apparatus as claimed in claim 9, by a multi-carrier wireless communication system in claim 14, and by a computer program as claimed in claim 15.

Accordingly, in order to reduce the overhead to implement adaptive modulation in a multi-carrier wireless communication system, the modulation control method proposed in this invention makes use of the monotonicity of the channel response to accelerate the algorithm to find appropriate bit loading schemes for the plurality of subcarriers, and to reduce the signaling overhead to inform a remote device about the schemes. The plurality of subcarriers are first split into frequency segments that comprise more than one subcarrier according to the channel response, and an individual modulation scheme is determined per frequency segment instead of per subcarrier. The monotonicity of the channel response is further leveraged to simplify the representation or storage of the determined modulation schemes.

In accordance with a first aspect of the invention a bit loading control method is provided. A bit loading control method in a multi-carrier wireless communication system for transferring data on a communication channel, which has a declining channel response with increasing frequency. The bit loading control method comprises the steps of: sending by an apparatus a request for a test signal; receiving by the apparatus the test signal from a remote device; obtaining an estimated channel response of the communication channel over a plurality of subcarriers based on the received test signal; determining according to the estimated channel response a bit loading scheme for allocating the plurality of subcarriers into one or more non-overlapping frequency segments, each comprising more than one adjacent subcarrier, and assigning to each of the frequency segments an individual modulation scheme that is shared by the more than one adjacent subcarrier, and wherein the individual shared modulation schemes are assigned in a monotonously reducing modulation order with increasing frequency.

A mobile wireless channel is characterized by the variations of the channel strength over time and over frequency. Such variations may result from either large-scale fading or small-scale fading. Large-scale fading is the result of signal attenuation due to signal propagation over certain distances and diffraction around objects in the propagation path. Small-scale fading refers to the changes in signal amplitude and phase that can be experienced as a result of small changes (as small as a half wavelength) in the spatial positioning between a transmitter and a receiver. Hence, large-scale fading is more relevant to link budget calculation, such as to estimate the communication coverage, while small-scale fading is more relevant to the design of a reliable and efficient communication system.

Channel state information (CSI) is typically used to describe how a signal propagates from a transmitter to a receiver and represents a combined effect of power decay with distance, scattering, and small-scale fading. The method to derive CSI is called channel estimation. Chanel estimation can be carried out either in a data-aided approach or a blind approach. In a data-aided approach, the channel estimation is based on pilot data or a training sequence that is known to both the transmitter and the receiver. In a blind approach, the estimation is based only on some unknown data received. Typically, it is assumed that a data-aided approach achieves better channel estimation accuracy at the cost of system-level complexity to define and transmit the pilot data or a training sequence. This invention considers the data-aided approach.

For the ease of the system design, a communication channel is usually modeled in terms of frequency channel response, or in short, channel response. Thus, channel response is embraced by the concept of CSI, which specifies CSI in a frequency domain.

Although particularly well suited for links in mobile applications the invention may also be used to configure a static link, by explicitly taking into account the channel variation as experienced in communication between devices due to a change in environment.

In the case of intensity modulated light wave communication, small changes in the order of half a wavelength of the optical signal (few hundreds of nanometers) may not lead to changes in the channel. In fact, the incoherent nature of the photon intensity flux does not allow cancellation at a single narrow spectral line. Meanwhile, for high speed modulation, cancellation effect can occur in the domain of the modulation (e.g. hundreds of MHz or GHz), with corresponding wavelengths in the order of a meter. Typically, diffused light and reflections inside the room tend to interfere with the signal resulting in a perceived attenuation in the higher portions of the modulation frequency range used, thereby resulting in an experienced declining frequency response. This together with the observation that the emitters, e.g. LEDs, and detectors, e.g. photodiodes may have a large surface area, thus high electrical capacitance, to capture the impinging light all contribute to a predominantly declining frequency response at the higher frequency ranges. The inventors have recognized that these effects, in isolation or jointly are characteristic for high speed optical communication and open an opportunity for improved efficiency that is particular to optical communications. At the same time other wireless communication channels may also have a predominantly low-pass response. Particularly, systems that employ wide baseband modulation, as opposed to carrier-shifted narrowband modulation, exhibit this behavior.

Note that the feature of a declining channel response with increasing frequency describes a general trend of the channel response over the entire channel bandwidth. There may well be a sporadic spike presented in an individual subcarrier due to a sudden noise or interference.

The communication channel addressed in this invention can be characterized as having a declining channel response with increasing frequency, which means that signals passing through the channel experience more attenuation at a higher frequency band/part than at a lower frequency band/part. Such monotonicity of the channel response provides an additional opportunity to facilitate system optimization.

As addressed above, adaptive modulation or adaptive bit loading is a method used to improve the channel capacity in a multi-carrier system by assigning the number of bits to each subcarrier depending on the channel characteristic of that subcarrier. However, to apply this method on a per subcarrier basis may suffer an efficiency penalty resulting from the extra computation complexity and signaling overhead. Therefore, it is advantageous to allocate the plurality of subcarriers into one or more non-overlapping frequency segments, with each frequency segment comprising one or more adjacent subcarriers and at least one frequency segment comprising more than one adjacent subcarrier. The computation to derive an appropriate modulation scheme may then be implemented on a per segment basis. The derived modulation scheme in turn can be shared by all the subcarriers comprised in the same segment.

It is preferred that each frequency segment comprises more than one adjacent subcarrier. However, it may happen in some cases that only one subcarrier is comprised in some of the frequency segments.

To derive the appropriate modulation scheme, the modulation control method may consider some other factors in addition to the channel response, such as the output power of the transmitter and the minimum required signal to noise ratio (SNR) for a receiver to demodulate and decode the received data traveling along the channel. However, the output power of the transmitter and the minimum SNR requirement of a certain modulation scheme are typically regarded as predefined or known information. Therefore, the channel response is the main dynamic factor in the assessment.

When the communication channel is relatively dynamic or there is no local or historical channel information available, it is preferred to obtain the estimated channel response based on a test signal from a remote device. To initialize the procedure to derive an up-to-date channel response, a request is first sent to a remote device. And then upon the received test signal, an estimated channel response of the communication channel over a plurality of subcarriers is obtained. The request may be sent as a standalone control or signaling message or be piggybacked in a data packet. Similarly, the test signal may be implemented as a training sequence comprised in a dedicated test packet or piggybacked in another data backet received from the remote device.

For a pair of remote devices to maintain up-to-date channel response information, such test packets, or dedicated control or signaling messages may be sent on an event-driven basis, such as upon a change in the propagation channel, which can be a movement of one of the two devices, or there is a further device blocking partially the propagation channel. In view of signal quality degradation in a recently received packet, one of the pair of remote devices may trigger the procedure to derive an updated channel response and to refresh the bit allocation scheme by first sending a request. The procedure may also be exercised regularly, such as according to a certain time schedule. It may also be that occasionally the pair of remote devices make use of idle periods to implement the disclosed method to keep the bit allocation scheme always up to date.

In a further option, the request may be sent as a broadcast or multicast message by the apparatus. All the remote devices around the apparatus or a subset of the neighboring remote devices may receive the request. One or more of the remote devices that receive the request may respond to the request by sending a test signal to the apparatus. In that sense, the apparatus may trigger the procedure to establish the channel response of a link between each responding remote device and the apparatus simultaneously.

The procedure may be initiated either by a receiver or a transmitter of an intended session. In one example, the receiver first sends a request to a transmitter for a test signal, and then upon the derived estimated channel response, the receiver determines the bit loading scheme to be used in the intended session between the transmitter and the receiver. In that sense, for a bidirectional link, the roles of transmitter and receiver exchange alternatively, such procedure may be triggered for each unidirectional link, respectively. On some occasions, symmetrically bi-directional link status can be assumed. And then, the procedure may only be trigger once. By assuming symmetrically bi-directional link status, it may well be that the transmitter initializes the procedure by first sending a request to the intended receiver. And then, the transmitter derives the estimated channel response based on a test signal received from the intended receiver, and further determines the bit loading scheme. The transmitter then uses the bit loading scheme straightaway in the subsequent data session with the intended receiver.

This proposed implementation may at first glance seem sub-optimal as compared to the per subcarrier approach with regard to the maximization of data throughput. However, if we take the computation and signaling overhead into account, the overall system may be even more efficient with the proposed implementation, especially when the channel response is approximately monotonous and does not change drastically over frequency. In fact, in the event that the actual frequency response is not strictly monotonous, but is substantially monotonously declining, an approximation by a monotonously declining response with the proposed method that particularly exploits a systematically lower response at high frequencies, is still beneficial.

From a practical point of view, a communication standard typically defines a limited set of potential modulation schemes in the physical (PHY) layer specification. In many standards, such potential modulation schemes are also defined in combination with coding schemes, which are called modulation and coding schemes. Therefore, a modulation scheme addressed in this invention should be understood the same as a modulation and coding scheme for those systems. Accordingly, the minimum SNR requirement for a receiver to demodulate and decode certain received data is also laid down given the combination of both modulation order and coding rate. Furthermore, the PHY layer specification typically also indicates such minimum SNR requirements for the limited set of modulation (and coding) schemes to be supported by the receiver side, which are listed in a monotonous order. Thus, the selection of individual appropriate modulation schemes for the one or more frequency segments is further simplified, considering the same monotonicity of the channel response of these frequency segments.

Data sent on the one or more adjacent subcarriers are modulated with the same modulation scheme assigned. The modulation here should be understood as mapping data bits to symbols. When a modulation scheme is represented by a constellation, such a bit-to-symbol mapping is also called constellation mapping. Different modulation schemes may be then distinguished by different constellation sizes. Note that channel coding may be first applied to the raw data bits before the step of modulation or the bit-to-symbol mapping.

In an OFDM-based system, a further step of OFDM modulation is needed, which is carried out by performing Inverse Fast Fourier Transform (IFFT) to convert parallel frequency domain data on the plurality of subcarriers to a serial time domain data to send on the channel.

Advantageously, the method further comprises the step of updating the bit loading scheme upon detecting a change of the channel response of the communication channel, wherein the update is made by keeping each frequency segment assigned with an individual modulation scheme comprising the same number of subcarriers and shifting the allocation of the frequency segments up or down in frequency according to the change of the channel response.

The individual shared modulation schemes assigned to each of the one or more non-overlapping frequency segments constitute a kind of bit loading profile. Upon detecting a change of the channel condition, it may also be an option to adjust the original bit loading scheme instead of triggering a new procedure to derive a brand new bit loading scheme, especially when the observed change on the channel condition is not significant.

The adjustment of the bit loading scheme is made by horizontally shifting the bit allocation table. For a certain modulation scheme, the number of subcarriers comprised in each frequency segment remains the same, but the allocation of the segments is shifted in frequency domain. The granularity of the shift can be on a per subcarrier basis. For example, when the channel condition is improved, the allocation of the one or more frequency segments may be shifted to a higher frequency by a first number of subcarriers; when the channel condition is degraded, the allocation of the one or more frequency segments may be shifted to a lower frequency by a second number of subcarriers. For each frequency segment, the number of subcarriers comprised in the segment is not changed. Thus, it is a kind of horizontal shift of the bit loading scheme in the frequency domain.

For the boundary conditions, it may happen that when the bit loading scheme is shifted to the right (towards higher frequency) by the first number of subcarriers, a new segment is generated at the start of the frequency band, which comprises the first number of subcarriers. The new segment may use a new modulation scheme with an even higher order modulation scheme that is not previously supported by the channel. Sometimes, when there is no even higher order modulation scheme to be supported in a practical system, the new segment may use the same highest modulation scheme as before, which may be equivalent to the extension of the first frequency segment in such a boundary condition.

Similarly, when the bit loading scheme is shifted to the left (towards lower frequency) by the second number of subcarriers, the first frequency segment at the lower bound of the frequency band may comprise less subcarriers than before, such as the second number of subcarriers are shifted out. If the first frequency segment comprises less subcarriers than the second number of subcarriers, the first segment may be shifted out completely and also part of the second segment, which means the previously highest order modulation scheme cannot be supported by the channel any more. In this case, the last frequency segment at the higher bound of the frequency band may use an even lower modulation order if the system supports. Otherwise, the last second number of subcarriers at the higher bound of the frequency band may not be used to load bits any more.

Alternatively, another update may also be made by keeping the same allocation of the one or more non-overlapping frequency segments and shifting the individual shared modulation schemes assigned to each of the one or more non-overlapping frequency segments up or down in frequency according to the change of the channel response.

Hence, the adjustment in the other update is made by keeping the allocation of the one or more non-overlapping frequency segments or the grouping of subcarriers untouched, but only to shift the bit loading profile. Since the individual shared modulation schemes are assigned in a monotonously reducing modulation order with increasing frequency, by simply shifting the individual shared modulation schemes assigned to each frequency segment up or down may easily accommodate the change on the channel. For example, when the channel is degraded, an originally assigned modulation scheme may not work for a certain frequency segment, and then another modulation scheme originally assigned to another frequency segment with a higher frequency may satisfy the link budget criteria, wherein the other modulation scheme has a lower modulation order. Depending on the extend of the change on the communication channel, the shift may be relevant to a modulation scheme originally assigned to an immediately adjacent frequency segment or to another frequency segment that is further away on frequency. Similarly, when the channel condition is improved, the shift is implemented by reusing a modulation scheme originally assigned to a first frequency segment with a lower frequency to a new frequency segment with a higher frequency.

Such shifting of the bit loading profile in the other update may also be understood by each one of the one or more frequency segments as either reducing the modulation order of the individual modulation scheme assigned to each of the one or more frequency segments when the channel response is degraded; or increasing the modulation order of the individual modulation scheme assigned to each of the one or more frequency segments when the channel response is improved.

In one example, the communication channel is an optical communication channel, and the channel response may be dominated by one or more components in the signal propagation chain. One possible component can be the optical front end of the transmitter, such as a light-emitting diode (LED). The modulation bandwidth of commercially available LEDs is typically quite constrained as compared to the optical wireless communication spectrum. Due to the LEDs' dynamic response, or carrier recombination processes, a LED presents power-limited first-order low-pass behavior, which may dominate the channel response of the optical communication channel. Very often the dynamics on the optical communication channel will be reflected merely on a shift of the channel response in frequency while remaining the same channel profile. Thus, keeping the same allocation of frequency segments and just shifting the bit loading profile accordingly will be very efficient, as compared to an alternative option of re-initializing the entire procedure to derive a new bit loading scheme.

In one embodiment, the method further comprises the step of sending the bit loading scheme to the remote device for use by the remote device in communicating with apparatus over the communication channel.

When the disclosed method is triggered by a receiver, the receiver will first communicate the determined bit loading scheme to the remote transmitter before the transmitter can apply the scheme in a subsequent data communication. However, when the disclosed method is triggered by a transmitter or the bit loading scheme is derived by the transmitter, it may not be required to communicate the bit loading scheme to the intended remote receiver in advance. Of course, to facilitate the remote device to detect the data packet with a proper setting, it is beneficial that the transmitter also informs the device about the allocation of frequency segments and the corresponding assignment of individual modulation schemes. Otherwise, extra complexity may be introduced to the remote device side to derive such information in order to demodulate and decode the packet properly. The information related to the bit loading scheme may be comprised in the same data packet that the determined bit loading scheme is exercised. For example, the transmitter may insert the information in the packet header, or immediate after the packet header and before the payload of the data packet.

Preferably, the method further comprises the step of storing locally the bit loading scheme.

When the pair of remote devices are predominantly stationary, the communication channel between the two devices may be stable for a certain period of time, and the same bit loading scheme, or at least part of the information comprised in an original bit loading scheme, may be reused by one or more sessions between the same pair of remote devices. For example, the shifting of the bit loading profile with regard to the change of the channel response is based on the original bit loading scheme. And hence, it may be quite beneficial for a device to store such information locally.

In a preferred setup, the test signal is comprised in either a dedicated probe packet or a dedicated field in a data or management packet.

To establish a new session between a pair of remote devices, in order to determine an up-to-date bit loading scheme, dedicated control packets or frames may be used. For example, the test signal may be comprised in a dedicated probe packet or probe frame. When there is already an earlier session between the pair of remote devices, the test signal may be piggybacked in a data or management packet or frame, such as being placed in a dedicated field in the data or management packet. As compared to a dedicated probe packet, the piggybacked approach can be more efficient.

Advantageously, a request for the test signal further comprises parameters related to the dedicated probe packet or the dedicated field in a data or management packet.

The initiator of the bit loading control method, either a transmitter or a receiver, may instruct the responder in preparing the test signal by including configuration parameters in the request. The configuration parameters may comprise information regarding a selection between a dedicated probe packet or a dedicated field in another packet, the pattern of the test signal, the duration of the test signal, or which part of the data or management packet can be used to insert the dedicated field for a test signal.

In another embodiment, the bit loading scheme is composed in a format using information comprising at least one of the following representations:
  an index of a lowest subcarrier within each frequency segment, an index of a highest subcarrier in any of the frequency segment;
  an index of a highest subcarrier within each frequency segment, an index of a lowest subcarrier in any of the frequency segment;
  an index of a lowest subcarrier in any of the frequency segment, and a number of subcarriers comprised in each frequency segment listed sequentially according to frequency from low to high;
  an index of a highest subcarrier in any of the frequency segment, and a number of subcarriers comprised in each frequency segment listed sequentially according to frequency from high to low;
  a number of subcarriers comprised in each frequency segment listed sequentially according to frequency from low to high.

The bit loading scheme communicated to a remote device comprises at least the information regarding the one or more allocation of frequency segments. Given the monotonicity of the frequency segments in terms of channel response along frequency, the individual modulation (and/or coding) schemes may be derived based on a predefined lookup table, such as the modulation and coding scheme (MSC) table defined in the PHY layer specification of a communication standard. Note that the MCS tables defined in the standards are typically formulated according to an increasing modulation order and listed as MCS0, MCS1, MCS2, and etc. In one example, the frequency segment with the highest subcarrier frequency may be assigned a lowest modulation order, such as MCS0. And then, each subsequent frequency segment with a reducing subcarrier frequency may be assigned a next higher modulation order in the MCS table. If there is any exception of the mapping between the options provided in the MCS table and the modulation orders assigned to the frequency segments, such as one or two options in MCS table are skipped due to a dramatic drop of the channel response, additional information may be provided by the modulation control unit. One possibility is that additional information may be sent to the remote device, such as indexes of assigned modulation orders for each frequency segment in the MCS table, or the indexes of skipped modulation orders in the MCS table.

The monotonicity of the channel response is further employed to simplify the representation of the adaptive modulation or bit loading method, in particular with regard to a more efficient signaling message to inform the remote device about the method and a reduced size in the memory of the transmitter and/or the receiver to store the related information for signal processing, such as modulation and/or demodulation, and encoding and/or decoding. Given the fact that the channel response declines monotonously with increasing frequency, the allocated modulation orders will also reduce monotonously with the increasing frequency.

Since the non-overlapping frequency segments are allocated in such a way that each frequency segment comprises one or more adjacent subcarrier, such bit loading scheme may be represented in a very compact manner. There are several options of the representation, such as either in an order of increasing frequency or decreasing frequency. One option is to present the information by indicating sequentially for each frequency segment the index of the lowest subcarrier that the frequency segment starts from, and the index of the highest subcarrier of the entire band comprising all the frequency segments. Note that here a lowest subcarrier or a highest subcarrier means that a subcarrier with a lowest subcarrier frequency or a subcarrier with a highest subcarrier frequency. Another option is to present the information by indicating the index of the lowest subcarrier of the entire band comprising all the frequency segments, and the number of subcarriers comprised in each frequency segment listed sequentially according to frequency from low to high. Similarly, the above-mentioned two options can also be presented with a decreasing frequency order by starting from the highest subcarrier of the entire band comprising all the frequency segments. A further option is that the allocation of the one or more frequency segment is recorded by listing a number of subcarriers comprised in each frequency segment sequentially, such as according to frequency from low to high. In this option, the range of sub-carriers may be already agreed between a pair of remote devices, for example by defining a first sub-carrier index and a last sub-carrier index.

To inform a remote device about the one or more allocations of the frequency segments, the compact format used to convey the information may be comprised in a dedicated signaling packet or message and is sent to the remote device before the start of a data packet transmission. Such dedicated signaling message may be transmitted with the lowest possible modulation order or the most robust modulation and coding scheme to make sure that the information will be delivered most reliably given a certain channel condition.

It may be even more beneficial that such a compact format is embedded in a header part of each data frame or data packet. Note that in a communication system a data packet typically comprises at least two portions a header part and a payload part, which are related to control information and user data, respectively. The control information comprised in the header part may be preamble, address information, sequencing information, modulation and/or coding schemes used in the payload part, payload length, and etc. By embedding the compact format in the header part of each data packet or data frame, the allocations of frequency segments may be updated in a more dynamic manner.

When a transmitter is the initiator of the bit loading control method, the transmitter may derive an updated channel response based on the ACK from the remote device, and then a new allocation of frequency segments may be determined or the shift of individual modulation schemes may be employed. By embedding the compact format conveying the new allocation in the packet header of the next data packet, the remote device can obtain the update in a timely manner. As a result of that, the system is more robust and agile in tackling changes on the communication channel.

Similarly, when a receiver is the initiator of the bit loading control method, the receiver may derive an updated channel response based on a recently received data packet, and update the bit loading scheme accordingly. The compact format conveying the update may feedback to the transmitter immediately by piggybacking such information in an ACK of the recently received data packet.

In one example, the communication channel is an optical communication channel, and the compact format may be embedded in a header part of a lighting communication data frame. The lighting communication data frame may be compliant to an IEEE 802.11 standard or an ITU G.9991 standard regarding high-speed optical wireless data communication.

Preferably, the individual modulation schemes are implemented with a uniform power loading on each of the frequency segments.

For wireless communication, the emission of a transmitter is subject to certain regional or national regulations on electromagnetic compatibility (EMC), such as regulations laid down by Federal Communications Commission (FCC) in US or European Telecommunications Standards Institute (ETSI) in Europe. Therefore, it is beneficial for the transmitter to apply a uniform power loading on each of the frequency segments, or a uniform power spectral density (PSD) in the entire band of the multicarrier system. This is because it provides the transmitter with the opportunity to use a maximum allowable output power for the entire band.

Alternatively, the transmitter may also apply a pre-emphasis technique to compensate the frequency selective channel response for a uniform received spectral density over the band at the receiver side. And then, the output power of the transmitter will get limited at a higher frequency first, which sacrifice the channel capacity at a lower frequency. If the declining channel response if fully or significantly compensated by a pre-emphasis filter, a same modulation order or a modulation and coding scheme may be applied to the entire band, namely the plurality of subcarriers.

In accordance with a second aspect of the invention a bit loading control apparatus is provided. A bit loading control apparatus for assisting in the transfer of data over a communication channel, which has a declining channel response with increasing frequency, in a multi-carrier wireless communication system, the bit loading control apparatus comprising: a transmitter configured to send a request for a test signal; a receiver configured to receive the test signal from a remote device; a controller configured to obtain an estimated channel response of the communication channel over a plurality of subcarriers based on the received test signal; and determine according to the estimated channel response a bit loading scheme for allocating the plurality of subcarriers into one or more non-overlapping frequency segments, each comprising more than one adjacent subcarrier, and assigning to each of the frequency segments an individual modulation scheme that is shared by the more than one adjacent subcarrier, and wherein the individual shared modulation schemes are assigned in a monotonously reducing modulation order with increasing frequency.

As disclosed above, the bit loading control apparatus may be comprised in a transmitter or a receiver to assist the pair of remote devices to implement the proposed adaptive bit loading or adaptive modulation scheme in an efficient manner, which provides a good balance between throughput enhancement and implementation overhead.

Advantageously, the bit loading control apparatus further comprises a memory to store the derived bit loading scheme, such as the one or more allocations of one or more non-overlapping frequency segments with each frequency segment comprising one or more adjacent subcarriers and the corresponding individual modulation schemes assigned to each of the one or more non-overlapping frequency segments.

Since the derived one or more allocations of the frequency segments to serve the adaptive bit loading method may be reused by a few consecutive data packets destined to the same remote device, it is beneficial to store such information locally in a memory. Considering a quite compact format may be used, it will not impose a big burden on the memory in terms of storage space and resource on reading-and-writing the information.

In one embodiment, the bit loading control apparatus is further configured to perform wireless communication with the remote device in the multi-carrier wireless communication system, wherein the transmitter is further configured to modulate data sent on the one or more adjacent subcarriers belonging to a same frequency segment with a same individual modulation scheme according to the bit loading scheme; and transmit the modulated data to the remote device over the communication channel.

In this embodiment, the bit loading control apparatus operates in a transmitter-initiated approach. Thus, the transmitter side of an intended session initializes the bit loading control method, and subsequently, the same device applies the determined bit loading scheme in modulating the data to be transmitted to a remote receiver device.

In another embodiment, the bit loading control apparatus is further configured to perform wireless communication with the remote device in the multi-carrier wireless communication system, wherein the receiver is further configured to receive data from the remote device over the communication channel; and demodulate data received on the more than one adjacent subcarrier belonging to a same frequency segment with a same individual modulation scheme according to the bit loading scheme.

With this option, the transmitter of the bit loading control apparatus is further configured to send the bit loading scheme to the remote device for use by the remote device in communication with the bit loading control apparatus.

In this option, the bit loading control apparatus operates in a receiver-initiated approach. Thus, the receiver side of an intended session initializes the bit loading control method and provides the bit loading scheme to a remote transmitter. Subsequently, the bit loading control apparatus applies the determined bit loading scheme in demodulating the data received from a remote transmitter device.

In a preferred system setup, the communication channel is an optical communication channel, and the bit loading control apparatus further comprises an optical front end configured to connected to the transmitter and receiver to transmit and receive data on the optical communication channel.

The optical front end is used to convert the electrical transmitting signals to output optical signals in the transmitter chain, and to convert received optical signals to electrical signals in the receiver chain. The optical front end comprises at least a light source in the transmitter chain, such as a LED, a Laser diodes (LD), or Vertical Cavity Surface Emitting Laser (VCSEL), and at least a receiving light sensor or photodiode in the receiver chain. Commercial LED usually presents power-limited first-order low-pass behavior. When the channel response of the optical communication channel is dominated by the LED, it will demonstrate a monotonously declining channel response with increasing frequency.

In accordance with a third aspect of the invention a multi-carrier wireless communication system is provided. A multi-carrier wireless communication system with a communication channel having a declining channel response with increasing frequency, the multi-carrier wireless communication system comprises either a first transceiver according to present invention and a remote device, wherein the remote device is configured to receive a bit loading scheme from the first transceiver and to demodulate data received from the first transceiver according to the received bit loading scheme; or a second transceiver according to the present invention and a second remote device, wherein the second transceiver is further configured to send a second bit loading scheme to the second remote device, and the second remote device is further configured to receive the second bit loading scheme from the second transceiver and to modulate data sent on the one or more adjacent subcarriers belonging to a same frequency segment with a same individual modulation scheme according to the received bit loading scheme; and transmit the modulated data to the second transceiver over the communication channel in the multi-carrier wireless communication system.

Since the disclosed bit loading control method may take either a transmitter-initiated approach or a receiver-initiated approach, the system may be of two configurations. In a first configuration, the first transceiver of the system operates in a transmitter-initiated approach; while in the second configuration, the second transceiver of the system operates in a receiver-initiated approach.

The transceiver is capable to perform wireless communication in such a multi-carrier system, such as an orthogonal frequency-division multiplexing (OFDM) based wireless system. The wireless channel may be located at different electromagnetic spectrums, such as radio frequency, microwave frequency, or the optical part, such as infrared, visible, or ultraviolet. Accordingly, the front end comprised in the transceiver may be an analog front end or an optical front end. In one example of the optical front end, a LED is used to convert electrical signals from baseband to optical signals to send over the channel.

The invention may further be embodied in a computer program comprising code means which, when the program is executed by a bit loading control apparatus comprising processing means, cause the processing means to carry out the bit loading control method of the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

FIG. 8 modulation-dependent parameters defined in IEEE 802.11 (2016) for OFDM PHY;

FIG. 9 illustration of a data frame format;

FIG. 10 schematically depicts basic components of a bit loading control apparatus of the present invention;

DETAILED DESCRIPTION OF EMBODIMENTS

Figure 1:
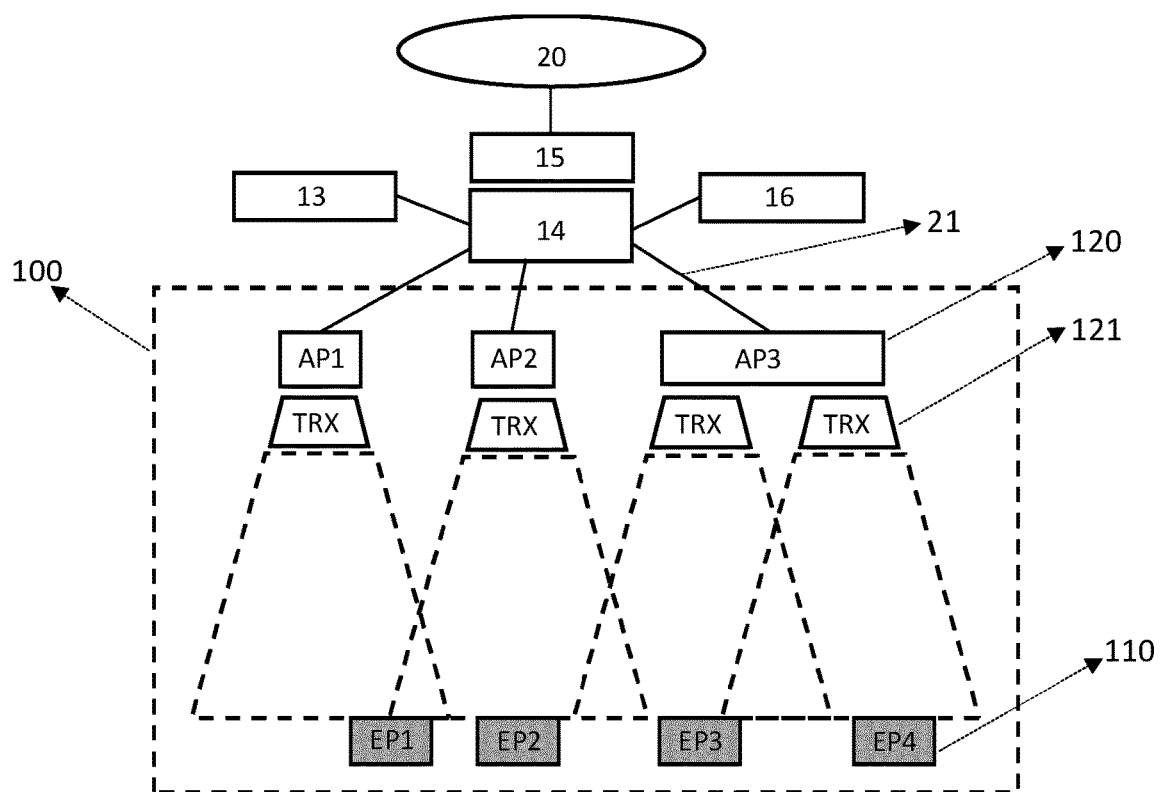
FIG. 1 demonstrates an overview of the OWC network, and the backbone network connected to it.

Various embodiments of the present invention will now be described based on an optical wireless communication (OWC) network system 100, or more specifically a Li-Fi network system, as shown in FIG. 1. For illustration purposes, the Li-Fi network 100 is connected to a backbone network 20 via an IP router 15 and an Ethernet switch 14, while in a practical system more routers and switches may be deployed to connect the backbone network to the Li-Fi network. In this example, the connection between the Li-Fi network and the backbone network is called a backbone connection 21. The backbone connection is a stable and high-speed link, which can be a wired connection, such as Ethernet, or a wireless connection based on radio frequency (RF) or millimeter-wave. The backbone connection can also be another kind of optical wireless link that is different from the one that an end point is performing in the optical multi-cell wireless network. One example of the other kind of optical wireless link can be free space point-to-point optical links.

Li-Fi System Overview and Network Architecture

As a wireless communication technology for local area networking, Li-Fi plays a similar role as Wi-Fi to provide the last tens of meters connectivity. A Li-Fi network 100 may comprise a plurality of optical access points (APs) 120 and network devices or end points (EPs) 110. Each end point 110 is selectively associated to and synchronized with a respective one of the access points 120. A Li-Fi AP 120 may be connected to one or multiple optical front ends or Li-Fi transceivers (TRX) 121, for providing access to Li-Fi devices or Li-Fi end points (EPs) 110. The trapezoids shown in dash lines illustrate field-of-views (FoVs) or coverage of individual Li-Fi transceivers 121. Only when an EP 110 is located in the coverage of a Li-Fi AP 120, will it be able to receive a downlink communication from that AP 120. By assuming symmetrical up and down links of the optical communication, a bidirectional optical link can be built up under the same condition. Because of the line-of-sight character of the optical communication link, adjacent access points 120 do not have a direct optical link amongst each other, whereas an end point 110 located in the overlapping area of the coverage of adjacent access points 120 is able to detect optical signals from both access points.

In one example, a Li-Fi AP 120 may also operate as a domain master with additional functionalities according to G. hn, ITU G.9960 and G.9961, to manage several Li-Fi EPs 110. In one implementation, handover happens when an EP roams from one domain to another. In another implementation, each Li-Fi AP 120 is operated as a domain master managing an individual domain hosting multiple Li-Fi EPs, which can be up to 255 Li-Fi EPs. Such Li-Fi APs 120 are typically located on the ceiling. They may, but not necessarily, be collocated with luminaires, especially when the communication is not based on visible light. The main functions of a Li-Fi AP 120 may include to advertise the presence of an AP 120 to Li-Fi EPs 110 in the surroundings, to register and deregister Li-Fi EPs 110, to provide medium access control (MAC) scheduling among associated Li-Fi EPs 110, to collect interference reports from EPs 110, to adjust local schedule in response to interference reports, and/or to report neighboring relations to the Li-Fi controller 13. Some of the functions of the Li-Fi AP 120, such as MAC scheduling for interference avoidance, may be implemented by the Li-Fi controller 13 in a centralized manner.

Li-Fi EPs or Li-Fi devices 110 are end user modems that facilitates end devices to connect to the Li-Fi network 100. Nowadays, a Li-Fi EP 110 is typically a dedicated entity connected to a laptop or other end devices. In the future, a Li-Fi EP 110 may be partially or fully integrated to a smart phone, a tablet, a computer, a remote controller, a smart TV, a display device, a storage device, a home appliance, or another smart electronic device.

There may be a L-Fi controller or central controller 13 connected to the plurality of access points 120 in the Li-Fi network 100. The Li-Fi controller or central controller 13 is in charge of controlling the Li-Fi system in a centralized manner when necessary, such as deriving information about the topology and neighboring relationship, deciding scheduling among different Li-Fi access points (APs) for interference suppression. Furthermore, Li-Fi controller 13 may also be employed to provide a user interface that allows a user or admin, such as an IT manager, to configure schedules among multiple Li-Fi APs, monitor reports from these Li-Fi APs, and/or to derive further statistic information about the system performance. It is typically ensured that there is only one Li-Fi controller 13 is visible to an individual AP, which is achieved by means of network configuration so that traffic to and from a Li-Fi controller 13 is isolated inside its own network segment, via virtual LANs (VLANs) or similar. Furthermore, a protocol, such as a Control and Provisioning of Wireless Access Points (CAPWAP) protocol, can be used to discover multiple controllers and to select one controller that has free resources to host/manage an access point joining an infrastructure.

In one exemplary implementation of the Li-Fi system, a Li-Fi synchronization server 16 is connected to the system, which is in charge of synchronizing (or aligning) the G.vlc medium access control (MAC) cycles of the different G.vlc domains. This is needed to align some common time slots for detecting neighboring APs 120 and avoiding interference to an EP 110 located in the overlapping area of neighboring APs 120. Because of the line-of-sight characteristic of an optical link, neighboring APs 120 typically cannot detect the signals from one another directly. However, an EP 110 located in the overlapping area of two neighboring APs 120 may experience interference if the neighboring APs 120 are transmitting simultaneously. To avoid such situation, it may be necessary to keep adjacent APs 120 synchronized to a common time base, and to prevent them to transmit at the same moment. One preferred option for network synchronization is to employ the Precision Time Protocol (PTP), IEEE 1588v2. The PTP provides a sub-microsecond accuracy, which is fair enough for inter G.vlc domain MAC alignment. To keep the PTP accuracy, support from Ethernet switch is necessary, which should also be PTP capable. To keep the PTP accuracy, any element in the Ethernet network must handle PTP so the switch selected for any deployment must support and be configured to operate in the PTP mode accordingly.

It may also happen that a Li-Fi system is to be deployed in a legacy system where PTP is not supported by the existing infrastructure. And hence, additional measures should be taken to synchronize neighboring APs 120 in a different and maybe sub-optimal manner, and accordingly a solution should be found for an EP 110 to deal with the non-ideal synchronization among neighboring APs 120.

Detailed System Description

Li-Fi AP

Figure 2:
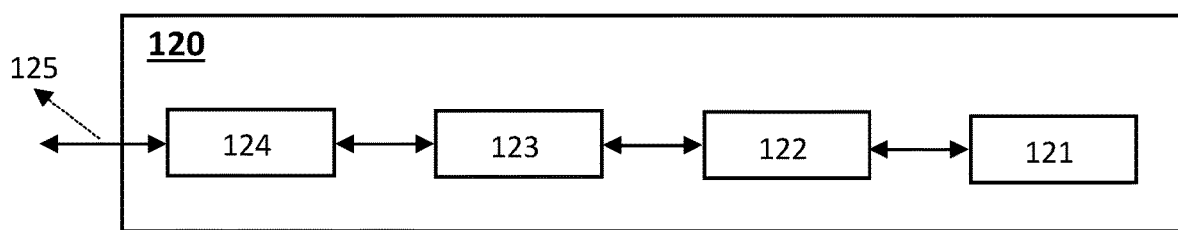
FIG. 2 schematically depicts basic components of a Li-Fi access point.

A Li-Fi AP 120 is a key unit to establish a Li-Fi network 100. In some scenarios, a Li-Fi AP 120 also forms the interface between an existing IT infrastructure and a Li-Fi network 100. A high-level block diagram of a Li-Fi AP 120 is shown in FIG. 2.

On one side, the Li-Fi AP 120 has an interface 124 to a backbone network, which can be a wired connection (Ethernet), or a wireless connection (RF, millimeter-wave, or another kind of optical wireless that is different from the one a Li-Fi EP is performing). And on the other side, the Li-Fi AP 120 has an optical front end 121 to enable the optical link with one or more Li-Fi EPs 110. Furthermore, the Li-Fi AP 120 also carries out the function to implement bi-directional translation or conversion between the data on the backbone network 20 and data on an optical link, in terms of conversion between different modulation schemes and conditioning of the analog signals. Therefore, a Li-Fi AP 120 comprises at least also a digital modulator and demodulator component 123 and an analog front end 122. In the transmission path, the analog front end (AFE) 122 may comprise a programmable amplifier, a filter, and a driver to condition and amplify the baseband signal to drive the optical front end. For the receiving path, the AFE 122 may comprise an attenuator, a low noise amplifier, a filter, and a programmable gain amplifier to accommodate the received signals for the further digital processing.

The optical front end 121 comprising at least a light source and a light sensor implements the conversion between electrical signals and optical signals. In the transmitter chain, the optical front end 121 is used to convert the electrical transmitting signals to output optical signals via the light source. In the receiver chain, the optical front end 121 is used to convert the received optical signals to output electrical signals via the light sensor for further signal processing. The optical front end 121 is also called Li-Fi transceiver (TRX), such that:

Li-Fi transmitter (Tx): transforms an electrical signal obtained from the AFE to an optical signal (e.g. to be emitted by an LED), and Li-Fi receiver (Rx): transforms a received optical signal (e.g. from a photodiode) to an electrical signal for the AFE.

Figure 3:
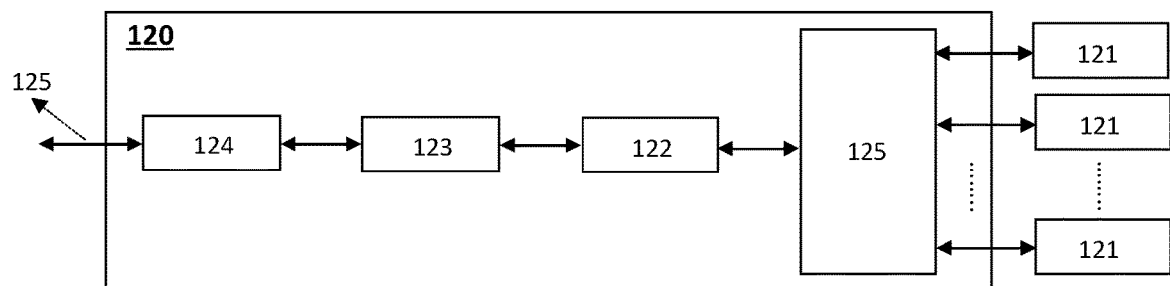
FIG. 3 schematically depicts basic components of a Li-Fi access point with multiple optical front ends.

A Li-Fi AP 120 may be connected to a single Li-Fi TRX 121, or multiple Li-Fi TRXs 121, which allows to transmit the optical signals over different optical paths. In case a Li-Fi AP 120 is connected to multiple Li-Fi TRXs 121, the Li-Fi AP may handle them as one coherent signal, or as (partially) separate incoherent signals for establishing a communication link. FIG. 3 shows an example of a Li-Fi AP 120 with multiple Li-Fi TRXs 121. A Li-Fi interface component 125 is adopted to split or combine the data sent to or received from the multiple Li-Fi TRXs 121.

Li-Fi EP

Figure 4:
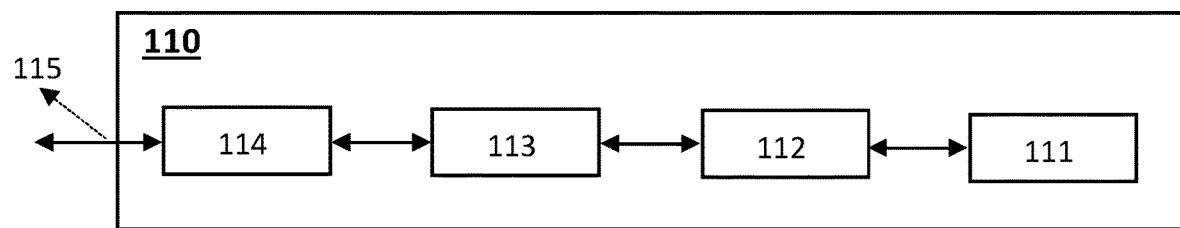
FIG. 4 schematically depicts basic components of a Li-Fi end point.

A high-level overview of a Li-Fi EP or a Li-Fi device 110 is shown in FIG. 4. Similar to a Li-Fi AP 120, a Li-Fi EP 110 comprises at least an optical front end 111, an analog front end 112, a digital modulator/demodulator 113, and an interface 114 to the end device or a processor.

A Li-Fi EP 110 may be connected to an end device as a separate entity via a cable or be partially or entirely integrated in the end device. For many end devices, such as laptop, smart phone, remote controller, Ethernet is a well-established interface in the operating system of the end devices. Li-Fi may also be used to provide communication interface to the end device in addition or instead. To simplify the system integration of a Li-Fi EP or Li-Fi device to the operating system of an end device, it is advantageous to employ Ethernet over USB. Therefore, in one option, the Li-Fi EP or Li-Fi device 110 can be connected to the end device via a standard USB cable or plug. With the example of using Ethernet over USB, a Li-Fi EP 110 may comprise the Ethernet over USB interface 114 and connect to the end device via a USB cable 115. A Li-Fi EP 110 may also be connected to one or more client optical TRXs 111, same as in a Li-Fi AP 120. Alternatively, a single optical frontend that has segmented transmitters/receivers where each transceiver/receiver is directed in a different respective direction is also envisaged.

In another example, a different interface 114 may be used to connect the Li-Fi EP to the operation system of the end device, and the corresponding interface 114 (Ethernet over USB) and/or the cable 115 should be replaced accordingly.

Figure 5:
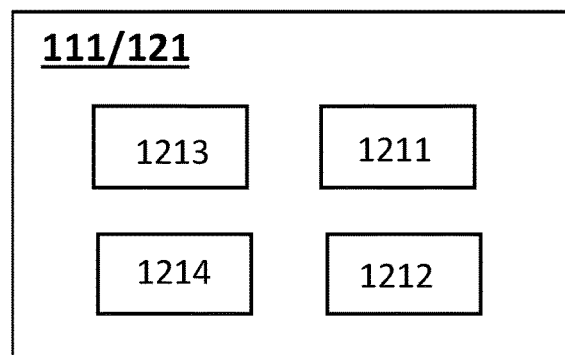
FIG. 5 schematically depicts basic components of an optical front end comprised in a Li-Fi access point or a Li-Fi end point.

FIG. 5 provides exemplary components of an optical front end or optical TRX 111,121 comprised in or connected to a Li-Fi AP 120 and a Li-Fi EP 110. An optical TRX 111, 121 comprises at least a light source 1211, a light sensor 1212, a driver 1213, and an amplifier 1214. The light source 1211 is used to convert the electrical transmitting signals to output optical signals, which can be a Light-emitting diode (LED), a Laser diodes (LD), or Vertical Cavity Surface Emitting Laser (VCSEL). The light sensor 1212 is used to convert the received optical signals to output electrical signals, which can be a photodiode, an avalanche diode, or another type of light sensor. The driver 1213 is mainly used for regulating the power required for the light source 1211. The amplifier 1214 is mainly used to condition the received signals by the light sensor 1212 to make the signals suitable for further processing in the electrical circuits. In one example, the amplifier 1214 can be a transimpedance amplifier (TIA), which is a current to voltage converter implemented with one or more operational amplifiers. TIA may be located close to the receiving light sensor or photodiode 1212 to amplify the signal with the least amount of noise.

Inter-Connection in a Li-Fi System

Typically, Li-Fi APs 120 are deployed on the ceiling. And such APs 120 need to be powered first in order to carry out communication activities. Therefore, the connections to the APs 120 are meant for both power and data. An AP 120 sets up bidirectional link with the cloud, or the backbone network 20 at one side via the backbone connection 21, and at the other side the AP 120 communicates with one or more associated EPs 110 via optical links. An EP 110 typically obtain power from the end device that the EP is coupled to or integrated in and communicates with an associated AP 120 via an optical link.

Connecting a Li-Fi AP to the Backbone Network

Different options can be taken for a Li-Fi AP 120 to get connected to the backbone network 20.

In one aspect, data and power may be jointly delivered to a Li-Fi AP, which can be implemented via a single power cable with power line communication (PLC) or a single Ethernet cable with power over Ethernet (PoE).

PLC makes use of the existing power line cables, i.e. for providing a device with mains power, also for data communication. Popular PLC communication standards, such as HomePlug® or G.hn, utilize Orthogonal Frequency Division Multiplexing (OFDM) technology, which is also adopted in a Li-Fi systems. Hence, the physical layers (PHY) of a PLC system and a Li-Fi system may be quite similar, such as the modulation methods and the synchronization methods used in both systems. However, transmission in the optical domain are unipolar whereas in general OFDM uses bipolar signals. As a result, some adaptation may be required for transmission in the optical network. A simple solution is the use of a DC-offset which does not require demodulation and subsequent remodulation of an OFDM based PLC signal prior to optical transmission, or alternatively demodulation and subsequent remodulation using unipolar OFDM modulation techniques such as ACO-OFDM, DCO-OFDM, ADO-OFDM and/or Flip OFDM. Therefore, it may be quite convenient for a Li-Fi AP 120, which is typically collocated with the luminaire on the ceiling, to make use of the existing power cable to obtain also the data connection to the backbone network 20.

However, it is also recognized that the channel of a PLC system is quite noisy, given that the mains power line may act as an antenna to pick up all kinds of undesired signals that may interfere with communication signals that are also present on the mains power line. It is thus important for the Li-Fi over PLC enabled devices to cope with such external interference. Furthermore, a communication signal over a mains power line experiences an amount of attenuation that cannot be predicted during manufacturing and may vary over the day. The impact factors include the length of the cable that varies from building to building, that power loads that form more or less a short circuit for high frequencies and be switched on or off, etc.

A known solution to address the problems introduced by a PLC system on signal integrity is to equip an Li-Fi over PLC enabled device with a PLC decoder for decoding a PLC communication signal received over the mains power line. Impairments on communication signals are handled digitally. For instance, a narrowband interferer causes error on just single subcarrier of an OFDM modulated signal. The reconstructed data may be corrected using error correction algorithms. Subsequently, the reconstructed data is then transformed back to the analog domain for modulating the LED current flowing to the at least one LED. In such a way, a more robust operating device can be provided wherein the loss of data is reduced, although one of the drawbacks of this solution is that the device gets large in size, complex, costly.

On the other hand, if power can be delivered via an Ethernet cable, it may also be convenient for a Li-Fi AP to make use of existing IT infrastructure to obtain both power and connection to the backbone network 20. Power over Ethernet (PoE) is described in the IEEE802.3af/at standard and is currently being extended towards 4-pair power in the IEEE Task Force P802.3bt. PoE is intended to supply power voltage levels of 40 V to 48 V from Power Sourcing Equipment (PSE) to Powered Devices (PDs), alongside data lines for control and communication purposes. A PSE device is also referred to as PoE switch. In PoE lighting systems PDs may be light sources, user interface devices and sensors. The PSE is typically powered from a mains power source, such as according to the IEC/TR 60083 standard. Traditional PoE systems will transport data and power over a network and its end points, hence among PSEs and PDs.

Data can therefore be received by the control device, e.g., via Ethernet connection using the Ethernet Protocol. Data is communicated via the Ethernet Protocol between devices in power over Ethernet systems. Therefore, a microchip in form of an Ethernet controller can be used to establish a communication link between the devices, which supports Media Access Control (MAC) and physical layer (PHY) of the Open Systems Interconnection model (OSI model).

An Ethernet connection can for example be an optical fiber, an electric wire or a twisted pair cable, such as a Cat 3 cable, Cat 4 cable, Cat 5 cable, Cat 5e cable, Cat 6 cable, Cat 6A cable, Cat 7 cable, Cat 7A cable, Cat 8 cable, Cat 8.1 cable, or Cat 8.2 cable. The Ethernet connection can have several pairs of cables, e.g., 2, 3, 4, or more pairs of cables. The cables can be unshielded or shielded, in particular individually or overall shielded. The power and data can be transmitted via the same fiber, wire, or cable of the Ethernet connection or via different fibers, wires, or cables of the Ethernet connection. In case of transmission of power via an optical fiber the power can be transmitted in the form of photons that can be received by a solar cell unit of the data receiving device.

The data receiving device in a PoE system can comprise one or more ports. Each of the ports can comprise one or more pins. A pin can be configured for receiving power, data or power and data. Additionally, or alternatively, the port can also comprise one or more solar cell units for receiving power in the form of photons. As the ports can receive power and data via the Ethernet connection some of the pins can be supplied with power, while other pins are supplied with data via the Ethernet connection. Alternatively, or additionally, a pin can also be supplied with power and data via the Ethernet connection.

In another aspect, data and power may be separately delivered to a Li-Fi AP, and the options can be either via both a power cable and an Ethernet cable (wired connection to a backbone network), or a combination of a power cable and a wireless link to the backbone 20 (optical wireless links or free space optical link).

Preferably, a Li-Fi system may be integrated to an existing wireless communication system, such as a Wi-Fi system or a cellular system. And hence, a Li-Fi AP 120 may be integrated to or directly-connected a Wi-Fi access point or a cellular base station. By having a conversion or translation of signals between the Li-Fi AP 120 and the Wi-Fi access point or the cellular base station, the existing infrastructure of a Wi-Fi system or cellular system can be employed to provide the connection to the backbone network 20 for the Li-Fi AP 120.

Connecting a Li-Fi EP to a Li-Fi AP

A Li-Fi EP 110 gets access to a Li-Fi system via a Li-Fi AP 120, and the associated Li-Fi AP 120 is often called a local AP. There are several aspects to be considered for the connection between a Li-Fi EP 120 and a Li-Fi AP 110:

Coverage: a Li-Fi EP may not always be able to see a Li-Fi AP depending on its location, its orientation, the positioning of the Li-Fi APs, and the size of the Li-Fi EP's transducer/sensor coverage area.

Downlink interference: a Li-Fi EP that is in the overlapping coverage area of multiple optical downlinks experiences interference if these Li-Fi APs transmit at the same time.

Uplink interference: A Li-Fi EP that transmits a signal to an associated Li-Fi AP while another Li-Fi EP is transmitting to this same Li-Fi AP results in uplink interference at the Li-Fi AP.

Handover: Because of the mobility of a Li-Fi EP, a handover is needed when a Li-Fi EP moves from the coverage area of one Li-Fi AP to a neighboring Li-Fi AP. That is to say, when a Li-Fi EP (such as connected to or comprised in a user device, a client device, a mobile phone, etc.), moves from the current cell to the neighboring cell, then any active communication must be handed over to the node or access point of that neighboring cell. Handovers are intended to be made as quickly as possible in order to reduce disruption to any ongoing communication or data transfers and may include a preparation period in order to facilitate this. When insufficient time is available to prepare and establish a link to the new Li-Fi AP before the link with the existing Li-Fi AP is broken, the Li-Fi EP may experience a period in which it has no connection. Considering the relatively small size of a Li-Fi cell due to the line-of-sight character of the optical link, seamless handover is important to guarantee the link quality and the user experience.

Basically, a Li-Fi EP 110 can be connected to a Li-Fi AP 120 via bidirectional optical link, or a hybrid downlink and uplink. Note that here the downlink stands for the communication link from the Li-Fi AP 120 to the Li-Fi EP 110, and the uplink stands for the communication link from the Li-Fi EP 110 to the Li-Fi AP 120. A bidirectional optical link enables a relatively symmetrical connection between the Li-Fi EP 110 and the Li-Fi AP 120. Hence, both downlink and uplink enjoy the same advantages of Li-Fi communication as addressed above. However, in some application scenarios, such as for web-surfing or video streaming, the link between a Li-Fi AP and a Li-Fi EP can also be a hybrid link, which is a combination of an optical downlink from the Li-Fi AP 120 to the Li-Fi EP 110 and a radio frequency (RF) uplink from the Li-Fi EP 120 to the Li-Fi AP 110. The RF link may be in accordance with a popular short-range wireless communication protocol, such as Wi-Fi, BLE, or Zigbee, or be in accordance with a cellular communication protocol, such as 4G or 5G cellular.

Referring back to the options that the Li-Fi AP 120 may be built via a combo device supporting both Li-Fi AP function and Wi-Fi access point or cellular base station function, such hybrid link can be handled seamlessly by a controller at the Li-Fi AP side. Since a Li-Fi EP 110 is typically connected or integrated to an end device, which can be a smart phone, a tablet, a computer, or another smart device, the end device may already have the hardware support for the short range wireless communication protocol or cellular protocol used in the hybrid link. Therefore, such hybrid link also leverages the existing resource of the end device and provide a simplified solution for the Li-Fi EP, which only requires a receiving path, but not a transmitting path. The cost, power consumption, and form factor of the EP 110 may be further reduced in such a manner. Correspondingly, the Li-Fi AP 120 is also simplified by comprising mainly an optical transmitter to send data to the Li-Fi EP 110 via an optical downlink, whereas the RF-based uplink from the Li-Fi EP 110 to the AP 120 may be received by leveraging the RF receiver in the combo device or co-located Wi-Fi access point/cellular base station, or via a dedicated RF receiver comprised in the Li-Fi AP 120 itself.

Scheduling and Interference Suppression Within an Optical Multi-Cell Wireless Network When there are multiple Li-Fi APs 120 deployed next to each other or when there are multiple EPs 110 associated to the same local AP 120 or to adjacent APs 120, medium access control (MAC) become necessary for an interference free optical communication. Different MAC mechanisms are possible to be employed in the optical multi-cell wireless network, such as time-division multiple access (TDMA), frequency-division multiple access (FDMA), carrier-sense multiple access (CSMA), code division multiple access (CDMA), space-division multiple access, or a combination of one or more aforementioned mechanisms. TDMA is based on time-division multiplexing scheme, where radio resource is scheduled in time domain and different time slots are assigned to different transmitters in a typically cyclically repetitive frame structure or MAC cycles. FDMA is based on frequency-division multiplexing, where different frequency bands are allocated to different devices for simultaneous transmission. And in optical communication, FDMA can also be evolved into wavelength division multiple access (WDMA), which is based on wavelength-division multiplexing. Another advanced version of FDMA is orthogonal frequency-division multiple access (OFDMA), where each device may use one or more subcarriers out of the entire band. OFDMA has more flexibility in providing different data rates or quality of service to different users, and in the meanwhile a high resource efficiency can be maintained despite of such diversity. CSMA typically employs "listen-before-talk" approach, where a device verifies the absence of any other traffic before transmitting on a shared medium. CSMA is widely used in a sparse network, and when the density of nodes scales, further collision-avoidance techniques come into place. CDMA is typically built on top of spread spectrum, and a common form is direct-sequence CDMA that is based on direct-sequence spread spectrum, where different devices send messages simultaneously with different spreading codes that are orthogonal to each other. Given the typically smaller FoV of an optical link as compared to a radio link, space-division multiple access may also be a very attractive solution here.

In a TDMA-based multi-cell network with multiple APs 120, due to the lack of direct communication, adjacent APs 120 sometimes may not have synchronous MAC cycles. Although the durations of one MAC cycle or super frame is typically the same for all the APs 120 in the network, the start times of MAC cycles can be different for individual APs 120. Note that the start time of a MAC cycle is used by an AP as a local time reference to divide the wireless medium into consecutive time slots. Such an offset of MAC cycles among two adjacent APs 120 may cause interference to an EP 110 located in the overlapping coverage areas of these two adjacent APs 120, even when a time slot is allocated exclusively to one AP 120 for communication with the EP 110 in the overlapping area. Therefore, it may be necessary for the APs 120 to synchronize to a common time base. The common time base may be obtained via synchronization handshake, via a reference clock distributed over the network (such as synchronous Ethernet clocks), or via a dedicated synchronization server in the network, or derived from a common signal, such as the zero crossing of the mains power. However, due to an uncertain delay in the network or an interference, there may still be timing synchronization uncertainty of the APs against the timing reference. It may still be necessary for an EP 110 located in the overlapping area of at least two adjacent APs 120 to derive timing information related to MAC cycles of the at least two APs 120 based on downlink communication from these APs, which can be either a normal data communication link or an out-of-band signaling message. Then, based on the derived timing information related to MAC cycles of the at least two APs 120, the EP 110 may further assist at least one out of the two adjacent APs 120 to adjust its MAC cycles to get aligned with the other.

Efficient Modulation Control

OFDM is widely used as a digital multi-carrier modulation method in many communication systems because it has a great advantage of robustness against severe channel conditions, such as narrowband interference or frequency selective fading. By splitting the entire band into a plurality of subcarriers, the system also has the flexibility to apply different modulation and coding schemes to individual subcarriers, which may be used to maximize the capacity of the channel. As described in earlier sections, the adaptive modulation or bit loading method may also confront penalty on system complexity and signaling overhead, especially when the number of subcarriers scales up, which results in limited enhancement of overall system performance. To achieve a more efficient adaptive modulation method, this invention discloses a method to make use of certain channel characteristics to greatly simplify the implementation complexity and signaling overhead.

The disclosed invention may be applied to any multi-carrier wireless system that has a similar channel condition as addressed by this invention. Without loss of generality, the system may be an optical wireless communication system, such as a Li-Fi system. LED is used to implement the electrical to optical conversion in a Li-Fi system. Although the OWC spectrum is around 2600 times larger than the entire radio spectrum, a Li-Fi system may not be able make full use of such spectrum to send data freely. The standard illumination LEDs are not intended or optimized for communication purposes, and the modulation bandwidth of commercially available LEDs is typically quite constrained as compared to the OWC spectrum. Due to the LEDs' dynamic response, or carrier recombination processes, LED presents power-limited first-order low-pass behavior. This low-pass nature of LEDs, in particular, its junction capacitance, deteriorates major portions of the spectrum while these can still contribute to the throughput. OFDM allows the use of different parts of the spectrum with a specific power and signal constellation. In more heavily attenuated parts of the spectrum, which contain a relative larger amount of noise, more robust signals can be used. More robust signals indicate smaller constellations, which carry fewer bits per symbol depending on the actual signal-to-noise ratio (SNR) level.

Furthermore, the maximum usable LED bandwidth is also dynamic, which depends on the distance from the LED to the receiving photo diode, the temperature, the noise level, and the dimming level. An adaptive algorithm may be needed to allocate the output power over frequency more efficiently, depending on an actual maximum usable LED bandwidth.

In view of the frequency selective channel response, various strategies have been proposed to assign power and bit loading to various frequency components. Waterfilling is known to be an optimum strategy for loading power in every frequency bin. The number of bit/s/Hz is chosen in accordance with the SNR of the various frequency bins. Waterfilling is based on a theoretical Lagrange optimization, which is regarded as a computation-intensive solution. More practical strategies are uniform power loading and uniform bit-loading with a pre-emphasis. Uniform power loading transmits the same power on all frequencies but adapts the constellation size accordingly, while the pre-emphasized power loading attempts to transmit the same number of bits (using the same constellation size) per sub-carrier but adapts the power to invert the channel attenuation.

Given the large attenuation at the high frequency part of a LED channel, to apply a pre-emphasis may imply that either highly attenuated high frequencies should be avoided, or only small constellation sizes can be used. In contrast, adaptive bit loading is more effective if a large portion of the channel are heavily attenuated.

Figure 6:
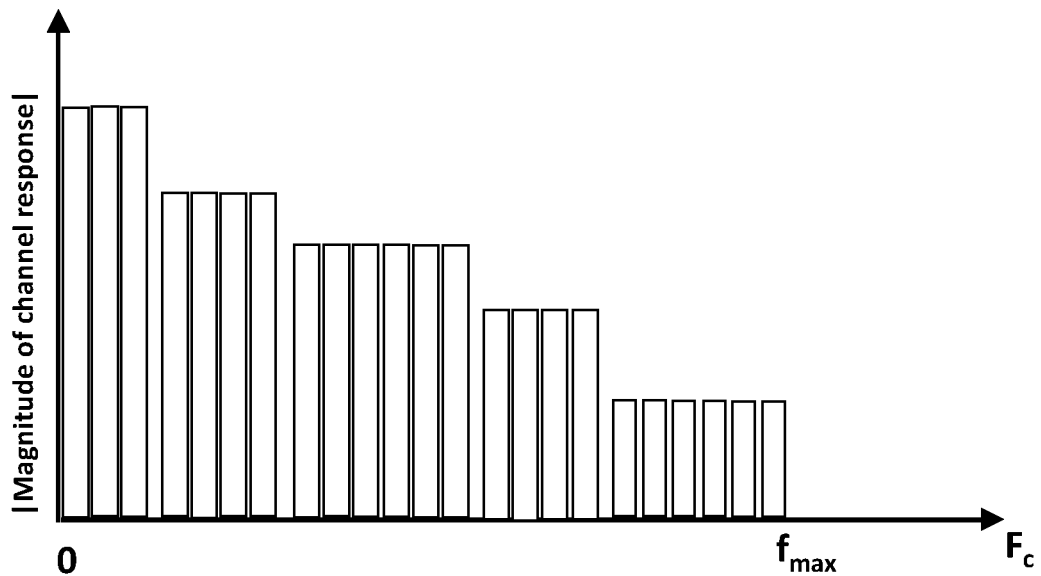
FIG. 6 illustration of a declining channel response with increasing frequency.

FIG. 6 provides an exemplary illustration of such a communication channel, which is characterized by a declining channel response with increasing frequency. Note that the smooth envelope of the frequency channel response shown in the figure is for the ease of demonstration, which does not exclude the channel conditions where there are one or more small ripples on the channel profile. It also means that the monotonous channel characteristic is observed for the entire frequency band, and a small deviation may still exist for certain subcarriers. That is also the typical case in a practical communication system.

Figure 7:
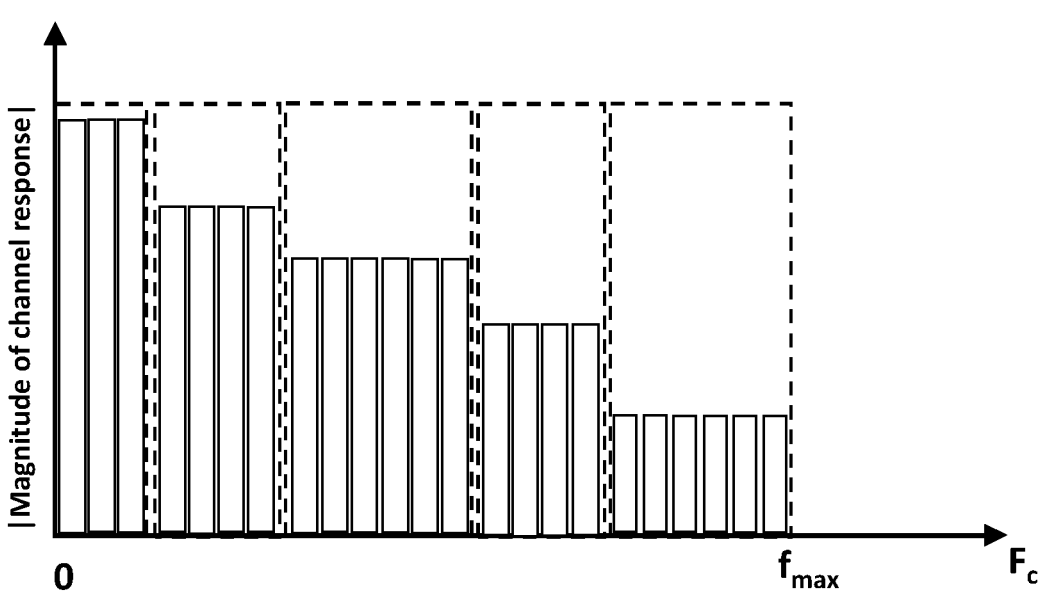
FIG. 7 illustration of allocation of one or more frequency segments.

Instead of calculating for each subcarrier a suitable modulation scheme, it is advantageous to accelerate the algorithm by first splitting the plurality of subcarriers into one or more non-overlapping frequency segments with each segment comprising more than one subcarrier. And then a suitable modulation scheme is assigned to each frequency segment and shared by all the subcarriers comprised in the same frequency segment. One example of such an allocation of one or more frequency segments is shown in FIG. 7. The range of a frequency segment is indicated by a dashed box. As illustrated in the figure, the number of subcarriers comprised in an individual frequency segment may be different from one another. The allocation of such frequency segments may rely on several factors. On one hand, it depends on channel response characteristics, such as the slope of the channel response or the deviation of the channel response among adjacent subcarriers. The flatter the channel response, or the smaller the deviation of the channel response among adjacent subcarriers, the more subcarriers may be comprised in one frequency segment. On the other hand, it also depends on the characteristics of modulation schemes supported by the system, such as the required minimum SNRs for different modulation orders, or the step of required minimum SNRs for adjacent modulation (and coding) schemes defined in the MCS table in the communication standard of the system. Furthermore, it may also depend on the strategy of performance tradeoff between throughput maximization and overhead minimization. The finer the allocation of frequency segments (less subcarriers in one segment), which allows less deviation of channel response among different subcarriers comprised in a single frequency segment, the higher the likelihood to boost the data throughput, whereas this also leads to increased system overhead.

As one example, the one or more non-overlapping frequency segments are allocated in such a manner that each frequency segment is to be assigned to a different modulation order or MCS supported by the system. Thus, the deviation of the channel response among the more than one subcarrier comprised in each segment is not larger than the step size between minimum SNR requirements of two adjacent modulation orders or MCSs. For a certain system design, the correlation between a certain modulation order and the minimum required SNR is deterministic.

For example, with the same coding rate of ½, to demodulate Binary Phase Shift Keying (BPSK) modulated signals it may require 3 dB SNR, while 5.5 dB may be required for Quadrature Phase Shift Keying (QPSK) modulated signals and 12 dB may be required for 16-quadrature amplitude modulation (QAM) modulated signals. Thus, the step size of minimum required SNRs between adjacent modulation orders also differs. And in this example, the step size between BPSK and QPSK is merely 2.5 dB, while the step size between QPSK and 16 QAM is 6.5 dB. When the channel response changes relatively linear in dB scale, the number of subcarriers comprised in each frequency segment will be mainly determined by the difference between minimum SNR requirements of adjacent modulation and coding schemes. Note that the numbers mentioned here are just for explanation purpose, which may differ depending on other system parameters and the hardware implementation.

FIG. 8 provides another example of the MCS table defined in IEEE 802.11 (2016) for OFDM PHY. It can be seen that the table is organized with an increasing modulation order, and for the same modulation order with an increasing coding rate. Thus, the minimum SNR requirement at a receiver side for a proper demodulation and decoding also increases monotonously with an increasing index in the table. Same as the previous example, depending on the combination of modulation order and coding rate, the step size of required minimum SNRs among two adjacent MCSs defined in the table may also differ a few dBs. Thus, even if the slope of the channel response is quite linear, the number of subcarriers comprised in each frequency segment may still differ because of the modulation characteristics.

Since both modulation characteristics and estimated channel response are considered when allocating the one or more frequency segments, the mapping between a frequency segment and an individual modulation scheme becomes straightforward. Thus, as one option, it is advantageous to inform the remote device only about the allocations of the one or more non-overlapping frequency segments, and to let the remote device to derive locally a corresponding modulation scheme for each frequency segment, because the information regarding the potential modulation orders or MCS table supported by the system should also be available at the remote device.

In some special cases, a larger frequency segment may be allocated by skipping one or more potential modulation orders or MCSs. This may happen when a portion of the channel response experiences a drastic change/attenuation. Another possible scenario may be that when an adjacent higher frequency segment comprises only a small number of subcarriers, it is more efficient to merge with a lower frequency segment by using a same lower modulation order. With such special cases, additional information may be provided by the modulation control unit of the transmitter to the remote device, such as the indexes of modulation orders or MCSs for the frequency segments.

To further reduce the overhead on storage and signaling, the allocation of frequency segments can be composed in a compact format. This can be especially beneficial if the transmitter has to provide such information to the remote device on a per packet or data frame basis. FIG. 9 provides an illustration of a simplified data frame format comprising two portions, a header part, and a payload part. A packet header is related to control information for packet reception, while the payload part contains actual user data. The packet header may further comprise several subfields, such as a preamble, address information, sequencing information, modulation and/or coding schemes used in the payload part, payload length, and etc. And hence, it is preferred to embed the compact format about the allocation of frequency segments in the header part of each data packet or data frame. Thus, the proposed adaptive modulation scheme may be updated in a more dynamic manner, such as upon the reception of an earlier packet from the remote device. The bit loading control apparatus may derive an updated channel response, and then a new allocation of frequency segments may be applied. Accordingly, the remote device can obtain the update timely with the compact format conveying the new allocation embedded in each data packet, an acknowledgement (ACK) packet, or a dedicated control packet. As a result of that, the system is more robust and agile in tackling any change on the communication channel.

FIG. 10 schematically depicts basic components of a bit loading control apparatus 1010 of the present invention. The bit loading control apparatus 1010 comprises at least a controller 1011, a transmitter 1012, and a receiver 1013. The transmitter 1012 is configured to send a request for a test signal, and the receiver 1013 is configured to receive a test signal. The controller 1011 is configured to obtain an estimated channel response and to derive the bit loading scheme based on the estimated channel response, as disclosed in the bit loading control method 700. The bit loading control apparatus 1010 may further comprise a memory 1014 to store at least the allocation of one or more non-overlapping frequency segments for the usage of signal processing or communication with the remote device. Depending on the mapping between the frequency segments and the potential modulation orders or MCSs supported by the system, additional information may be stored to clarify the assignment of modulation orders or MCSs for each frequency segment.

The bit loading control apparatus 1010 may be further configured to perform wireless communication in the multi-carrier wireless communication system after implementing the adaptive bit loading method. When the bit loading control apparatus 1010 is configured to operate in a transmitter-initiated approach, the transmitter 1012 of the bit loading control apparatus 1010 is further configured to modulate data sent on the one or more adjacent subcarriers belonging to a same frequency segment with a same individual modulation scheme according to the bit loading scheme; and transmit the modulated data to a remote receiving device over the communication channel.

When the bit loading control apparatus 1010 is configured to operate in a receiver-initiated approach, the transmitter 1012 of the bit loading control apparatus 1010 is further configured to send the determined bit loading scheme to a remote device, and wherein the remote device is the intended transmitter of a data session and the bit loading control apparatus 1010 is the intended receiver side of the data session. The receiver 1013 of the bit loading control apparatus 1010 is further configured to receive data from the remote transmitting device over the communication channel; and demodulate data received on the more than one adjacent subcarrier belonging to a same frequency segment with a same individual modulation scheme according to the bit loading scheme.

Accordingly, a multi-carrier wireless communication system may comprise a first transceiver 1100 operating as the bit loading control apparatus 1010 with the transmitter-initiated approach, and a remote receiving device. The first transceiver 1100 is further configured to modulate data sent on the one or more adjacent subcarriers belonging to a same frequency segment with a same individual modulation scheme according to the bit loading scheme; and transmit the modulated data to the remote receiving device over the communication channel. The remote receiving device is configured to receive a bit loading scheme from the first transceiver 1100 and to demodulate data received from the first transceiver 1100 according to the received bit loading scheme.

The modulation here indicates the bit-to-symbol mapping. When a modulation scheme is represented by a constellation diagram, such a bit-to-symbol mapping is also called constellation mapping. Different modulation schemes may be then distinguished by different constellation sizes. With a combined modulation and coding scheme assigned, the raw data bits first go through channel encoding, and then the coded bits are modulated to data symbols. In an OFDM-based system, a further step of OFDM modulation is needed to have further processing on the data symbols, and the further step is carried out by performing Inverse Fast Fourier Transform (IFFT) to convert parallel frequency domain data symbols on the plurality of subcarriers to a serial time domain data to send on the channel.

Accordingly, for an OFDM-based system, before the demodulation or de-mapping of data symbols to bits, an earlier step of processing received data from the channel for OFDM demodulation is needed. Fast Fourier Transform (FFT) is used to convert the serial time domain received data to parallel frequency domain data symbols on the plurality of subcarriers. And then the demodulation control unit may demodulate data symbols on the one or more adjacent subcarriers belonging to the same frequency segment with the same individual modulation scheme determined.

As a second setup, the multi-carrier wireless communication system may comprise a second transceiver 1200 operating as the bit loading control apparatus 1010 with the receiver-initiated approach, and a second remote transmitting device. The second transceiver 1200 is further configured to send a second bit loading scheme to the remote transmitting device, and the second remote transmitting device is further configured to receive the second bit loading scheme from the second transceiver 1200; modulate data sent on the one or more adjacent subcarriers belonging to a same frequency segment with a same individual modulation scheme according to the received bit loading scheme; and transmit the modulated data to the second transceiver 1200 over the communication channel in the multi-carrier wireless communication system.

The bit loading control apparatus 1010 may optionally comprise a user interface, which can provide users with extra convenience of status inquiry or operation of the device.

Figure 11:
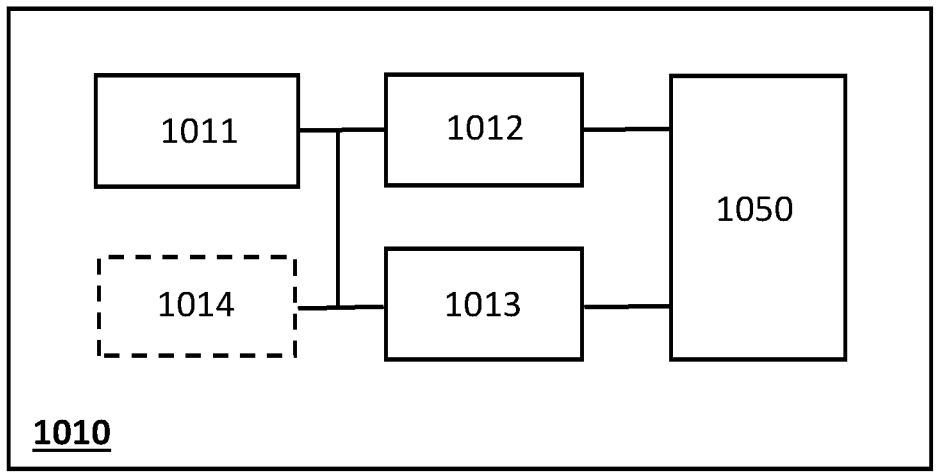
FIG. 11 schematically depicts basic components of a bit loading control apparatus according to one embodiment.

FIG. 11 schematically depicts basic components of a bit loading control apparatus 1010 according to one embodiment. The bit loading control apparatus 1010 further comprises a front end 1050 connected to the transmitter 1012 and the receiver 1013. The front end 1050 is configured to transmit and receive data on the wireless communication channel, which may make use of one of several electromagnetic spectra, such as the radio frequency spectrum, microwave frequency spectrum, or the optical spectrum. In addition, it may use a subset of the optical spectrum, such as the infrared, the visible, or the ultraviolet spectrum. In a preferred setup, the front end 1050 is an optical front end 111, 121, the front end 1050 may be constructed using the sub blocks as disclosed in earlier sections and in FIG. 5. Thus, the optical front end 1050, 111, 121 coverts the electric signal as generated by the bit loading control apparatus to an optical signal for transmission over the optical channel, e.g. using a LED. Likewise, the optical front end 1050, 111, 121 receives the optical signal and converts this to an electrical signal, e.g. using a photodiode or other photodetector.

In a preferred system setup, the bit loading control apparatus 1010 may be incorporated as part of a Li-Fi access point 120 or Li-Fi end point 110. The disclosed method facilitates more efficient adaptive bit loading to be applied to the optical link between a Li-Fi access point 120 and a Li-Fi end point 110.

Figure 12:
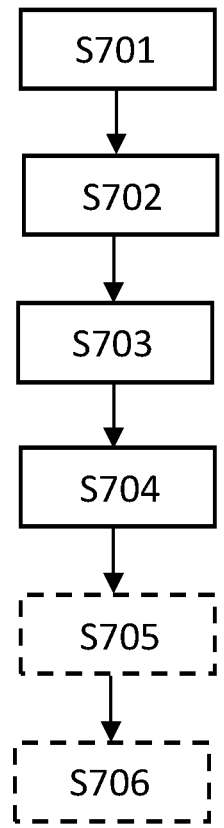
FIG. 12 shows a flow diagram of a bit loading control method.

The flow diagram of the modulation control method 700 is shown in FIG. 12. In step S701, the bit loading control apparatus sends a request for a test signal; and receives the test signal in step S702. An estimated channel response of the communication channel over a plurality of subcarriers is obtained in step S703 based on the received test signal. And then in step S704, a bit loading scheme is determined according to the estimated channel response for allocating the plurality of subcarriers into one or more non-overlapping frequency segments, each comprising more than one adjacent subcarrier, and assigning to each of the frequency segments an individual modulation scheme that is shared by the more than one adjacent subcarrier, and wherein the individual shared modulation schemes are assigned in a monotonously reducing modulation order with increasing frequency.

The method 700 may further comprise step S705 of detecting a change of the channel response of the communication channel, and upon the detection, a step S706 of updating the bit loading scheme, wherein the update is made by keeping the same allocation of the one or more non-overlapping frequency segments and shifting the individual shared modulation schemes assigned to each of the one or more non-overlapping frequency segments up or down in frequency according to the change of the channel response.

Given the characteristic of the wireless communication channel addressed in the present invention, the profile of the channel response may remain roughly unchanged while the response may shift in frequency. Since the channel has a declining channel response with increasing frequency, a further degradation of the channel may indicate the original channel response curve shift towards lower frequency, and a further improvement of the channel may indicate the original channel response shift towards higher frequency. Thus, it may not be necessary to trigger an entire new procedure to determine another bit loading scheme upon detection a change on the channel. Instead, keeping the same frequency segments and applying a shift of the bit loading profile to each frequency segment according to the shift of the frequency response may be a very efficient solution, especially when the change on the channel response is not significant.

Optionally, the method 700 may further comprise a step S707 of sending the bit loading scheme for communicating with a remote device over the communication channel. Depending on the disclosed method is operated in a transmitter-initiated approach or a receiver-initiated approach, the remote device may be either a receiving device or a transmitting device of the anticipated data link.

In another example, the method 700 may further comprise a step S708 of storing locally the bit loading scheme for later use.

The disclosed invention may be incorporated in a Li-Fi related standard. Here an example is taken with the background of ITU-T G.9960 and ITU-T G.9961, which describes the ITU recommendation for in-home networks regarding the system architecture and the physical layer. For determining how many bits each sub-channel can be loaded, a so-called Bit Allocation Table (BAT) is applied. A frame according to ITU-T G.9960 comprises a preamble, a header, additional channel estimation symbols and the payload. The header of the frame indicates the type of the frame. For data frames, management frames, and acknowledge (ACK) frames, the applied BAT is indicated in the variable part of header with a 5-bit identifier BAT_ID. To determine a BAT, the receiver measures the signal quality according to a test-signal sent by the transmitter. Test signals may be one of the two types: probe frames that carry probe symbols in the payload part, and ACE symbols added in a data or management frame placed between header and payload part. The receiver then determines which BATs the transmitter may apply.

A BAT can be applied to a part/region of a MAC-cycle. To estimate the channel in a region of the MAC-cycle, the receiver may instruct the transmitter to send probe frame in that region of the MAC-cycle. Different BATs can be applied for different regions of the MAC-cycle. The sub-carriers can be grouped in 2, 4, 8, or 16 sub-carriers per group. Such grouping is quite rudimental, meaning that the grouping is uniform over all sub-carriers of the band plan.

The channel estimation protocol is initiated by the receiver by sending a CE_Initiation.req message to which the transmitter replies with a CE_Initiation.cnf message. The transmitter may also trigger the receiver to initiate a channel estimation by sending a CE_Initiation.ind message.

The receiver provides the transmitter with following parameters when sending the CE_Initiation.req message:
New BAT-ID
Minimum value for grouping
Channel estimation window (which part of the MAC-cycle to estimate)
Parameters for probe frame The receiver may request for probe frames (and may change the parameters for that). Upon request, the transmitter sends probe frames. For sending probe frames, the transmitter needs resources in the MAC/cycle, which it needs to get from the domain master. The receiver terminates the process by sending the outcome of the channel estimation with an update message that provides information on the BAT. The receiver sends a CE_ParamUpdate.req to which the transmitter replies with a CE_ParamUpdate.cnf message. The transmitter may request for a retransmission of the channel estimation result with a CE_ParamUpdate.ind message.

The protocol allows faster channel adaptation by omitting the initiation process (omitting CE_ParamUpdate.req, CE_ParamUpdate.cnf) and directly jumping to a sub-part of the process.

Unsolicited request—determine a new BAT by sending an update message:
CE_ParamUpdate.req, which comprises following parameters:
New BAT ID
Bandplan
Grouping
BAT valid mask—which of the BATs are currently valid for the node
BAT valid times in MAC cycle—this allows to make the BAT specific for MAC-cycle parts
Range of sub-carriers (range of sub-carrier groups) with non-zero bits ($TIDX_{MIN}$ ... $TIDX_{MAX}$)
Bit allocation Table with 4 bits per sub-carrier or per group (for all sub-carriers)
Partial Update Request—Determine a New BAT by Updating an Existing BAT CE_PartialBatUpdate.req That Carries Parameters Like
Old+New BAT ID (new BAT ID is after changing the BAT)
Number of BAT entries to be updated
Bit allocation Table-entries with sub-carrier index+4 bits per sub-carrier or per group (for part of the sub-carriers)
Probe request—directly request for probe frames CE_ProbeRequest.ind, ACK_CE_CTRL
ACE request—ask to insert ACE symbols CE_ACESymbols.ind
Number of ACE symbols that transmitter must add to all frames (between header and payload)

The field containing the table bit-allocation in the CE_ParamUpdate.req message can be compressed. For that purpose, the table is divided into groups (compressed and non-compressed). For a compressed group, the number of instances and the bit allocation are indicated for the sub-carriers in the group.

An initial bit allocation may be determined by a receiver and be communicated to a transmitter via an CE_ParamUpdate.req message. If no grouping is applied (G=1), the BAT index represents a sub-channel. If grouping is applied (G>1), the BAT index represents a group of sub-channels. Note that for some higher sub-channels the BAT values may be zero, meaning that the corresponding sub-channel(group)s are unloaded.

Once a BAT has be settled, it can be adapted by shifting the BAT values in the BAT. If the signal quality improves, the BAT values are shifted up in the BAT (towards higher frequencies).

Figure 13:
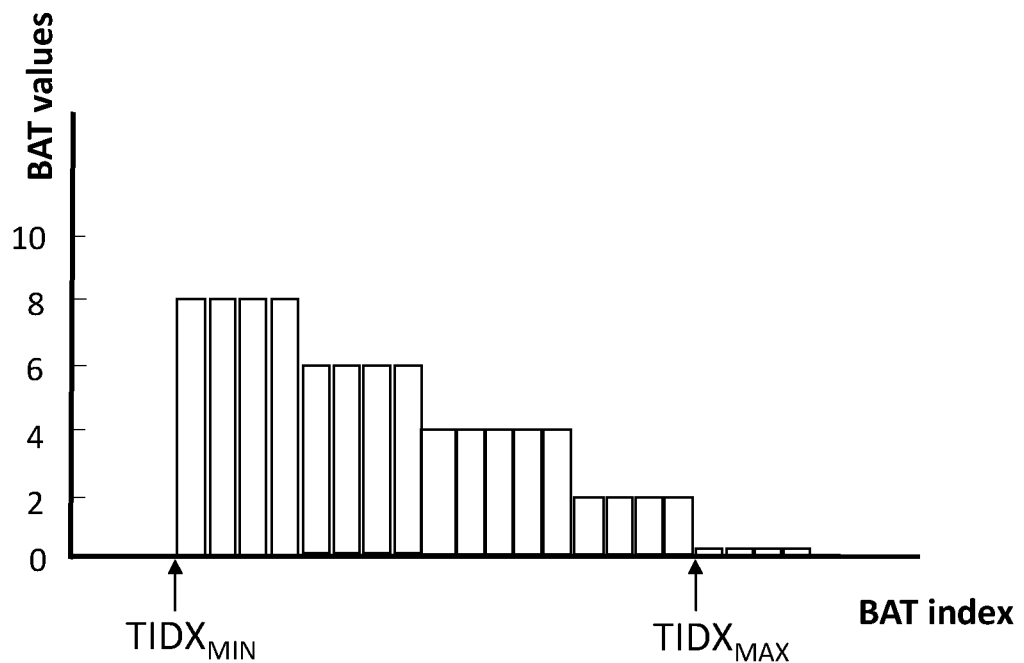
FIG. 13 shows an example of an initial bit allocation table.
Figure 14:
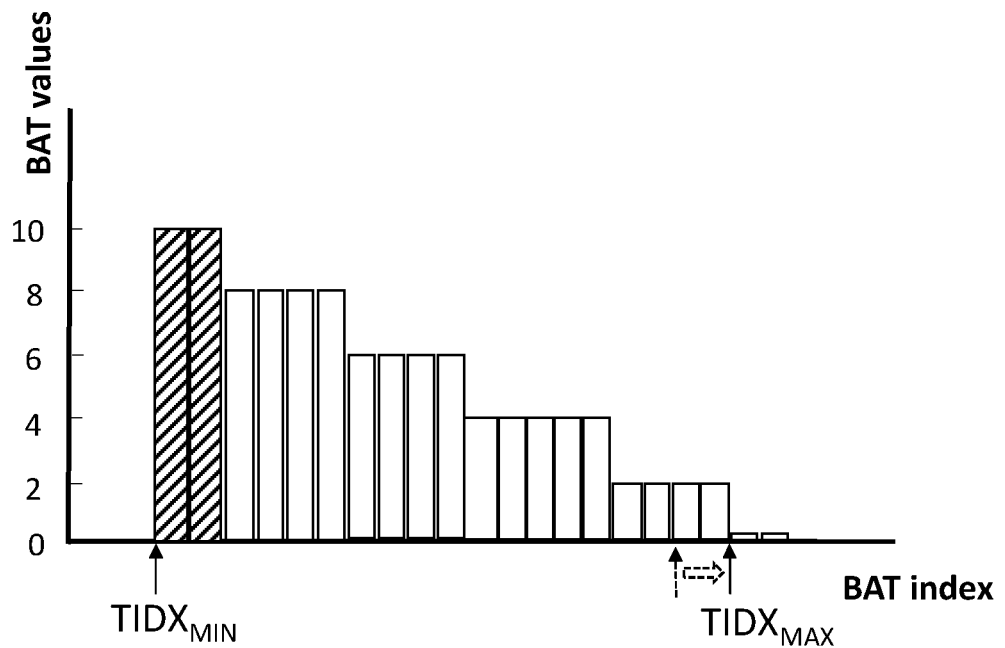
FIG. 14 demonstrates the result of shifting up the values in the bit allocation table by two in respect to the initial bit allocation of FIG. 13.
Figure 15:
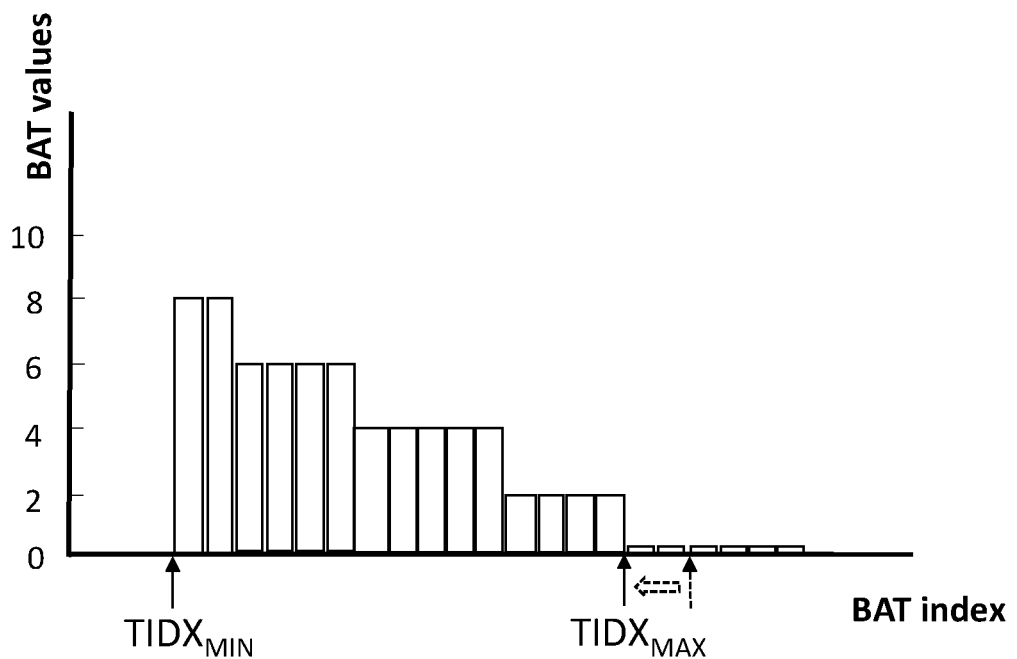
FIG. 15 demonstrates the result of shifting down the values in the bit allocation table by two in respect to the initial bit allocation of FIG. 13.

FIG. 13 provides an example an initial BAT. FIG. 14 demonstrates the result of shifting up the values in the BAT by two in respect to the initial bit allocation of FIG. 13. Note that the first two BAT-entries have new values and that the BAT range with non-zero values has been increased with two entries at the higher frequency boundary as compared to the initial allocation in FIG. 13. If the channel condition gets worse, the BAT values are shifted down in the BAT. FIG. 15 illustrates the result of shifting down the values in the BAT by two in respect to the initial bit allocation of FIG. 13. Note that the last two BAT-entries are now zero and that the range with non-zero values has been decreased with two entries at the higher frequency boundary as compared to the initial allocation in FIG. 13.

The protocol of the ITU recommendation can be extended by defining two new messages:
CE_ParamShift.req (See Table 1 and Table 2 with either the transmitter or the receiver determines new $TIDX_{MIN}$ and $TIDX_{MAX}$)
CE ParamShift.cnf (See Table 3)

TABLE 1

Format of CE_ParamShift.req message (version 1 Transmitter determines new $TIDX_{MIN}$ and $TIDX_{MAX}$)

| Field | Octet | Bits | Description |
|---|---|---|---|
| O_BAT_ID | 0 | [4:0] | This field indicates the BAT_ID associated with the BAT to be adapted by the CE_ParamShift.req. It shall be formatted as shown in Table 7-57 of [ITU-T G.9960]. |
| Reserved | | [7:5] | Reserved by ITU-T (Note 1). |
| N_BAT_ID | 1 | [4:0] | This field indicates the BAT_ID associated with the BAT adapted by the CE_ParamShift.req. It shall be formatted as shown in Table 7-57 of [ITU-T G.9960]. |
| Reserved | | [7:5] | Reserved by ITU-T (Note 1). |
| Shift | 2 | [3:0] | 4-bit integer indicating the amount of shifting the BAT entries in the BAT table. S ≠ 0.<br>Let i be the index of a sub-channel and BAT(i) the bit loading for sub-channel i. (Note 2)<br>$TIDX_{MIN}$ be the lowest index and $TIDX_{MAX}$ the highest index at which sub-channels are currently loaded.<br>For shifting up, the condition shall be met that $TIDX_{MAX} + (S + 1)*G - 1 \leq$ StopSubCarrier<br>If the Direction indicates that the BAT values are shifted down, the shift value S indicates that<br>$TIDX_{MAX} = TIDX_{MAX} - S * G$<br>for i = $TIDX_{MIN}$ to $TIDX_{MAX} + G - 1$<br>BAT(i) = BAT (I + S * G)<br>for $TIDX_{MAX} + G$ to $TIDX_{MAX} + S * G - 1$<br>BAT(i) = 0<br>If the Direction indicates that the BAT values are shifted up, the shift value S indicates |

TABLE 1-continued

Format of CE_ParamShift.req message (version
1 Transmitter determines new $TIDX_{MIN}$ and $TIDX_{MAX}$)

| Field | Octet | Bits | Description |
|---|---|---|---|
| | | | $TIDX_{MAX} = TIDX_{MAX} + S * G$ |
| | | | for i = $TIDX_{MAX}$ + G − 1 to S * G |
| | | | BAT(i) = BAT (i − S * G) |
| | | | for i = $TIDX_{MIN}$ to $TIDX_{MIN}$ + S * G − 1 |
| | | | BAT(i) = new value according to the fields B1 to Bn |
| | | | Let X denote the smallest integer larger than or equal to S/2 |
| Reserved | | [6:4] | Reserved by ITU-T (Note 1). |
| Direction | | 7 | Direction of shifting |
| | | | The value 0 indicates that the BAT values are shifted down |
| | | | The value 1 indicates that the BAT values are shifted up |
| B1 | 3 | [3:0] | 4-bit unsigned integer indicating the number of bits assigned to sub-carrier indices $TIDX_{MIN}$ to $TIDX_{MIN}$ + G − 1 |
| | | | This field only exists if BAT_COMPRESSION field is set to zero AND the direction bit is set to 1 AND S > 0 |
| | | [7:4] | 4-bit unsigned integer indicating the number of bits assigned to sub-carrier indices $TIDX_{MIN}$ + G to $TIDX_{MIN}$ + 2 * G − 1 (Note 3) |
| | | | This field only exists if BAT_COMPRESSION field is set to zero AND the direction bit is set to 1 AND S > 1 |
| . . . | . . . | . . . | |
| Bx | 3 + X | [3:0] | 4-bit unsigned integer indicating the number of bits assigned to sub-carrier indices $TIDX_{MIN}$ + (S − 1) * G to $TIDX_{MIN}$ + S * G − 1 |
| | | | This field only exists if BAT_COMPRESSION field is set to zero AND the direction bit is set to 1 AND S > 2 |
| | | [7:4] | 4-bit unsigned integer indicating the number of bits assigned to sub-carrier indices $TIDX_{MIN}$ + (S − 1) * G to $TIDX_{MIN}$ + S * G − 1 |
| | | | This field only exists if BAT_COMPRESSION field is set to zero AND the direction bit is set to 1 AND S > 3 |

(Note 1)
Bits that are reserved by ITU-T shall be set to zero by the transmitter and ignored by the receiver.
(Note 2)
Sub-carrier index represents the physical index (clause 7.1.4.1 of [ITU-T G.9960]).

TABLE 2

Format of CE_ParamShift. req message (version
2 Receiver determines new $TIDX_{MIN}$ and $TIDX_{MAX}$)

| Field | Octet | Bits | Description |
|---|---|---|---|
| O_BAT_ID | 0 | [4:0] | This field indicates the BAT_ID associated with the BAT to be adapted by the CE_ParamShift.req. It shall be formatted as shown in Table 7-57 of [ITU-T G.9960]. |
| Reserved | | [7:5] | Reserved by ITU-T (Note 1). |
| N_BAT_ID | 1 | [4:0] | This field indicates the BAT_ID associated with the BAT adapted by the CE_ParamShift.req. It shall be formatted as shown in Table 7-57 of [ITU-T G.9960]. |
| Reserved | | [7:5] | Reserved by ITU-T (Note 1). |
| Shift | 2 | [3:0] | 4-bit integer indicating the amount of shifting the BAT entries in the BAT table. S ≠ 0. |
| | | | Let i be the index of a sub-channel and BAT(i) the bit loading for sub-channel i. (Note 2) |
| | | | $TIDX_{MIN}$ is the lowest index and $TIDX_{MAX}$ the highest index at which sub-channels are currently loaded. |
| | | | The receiver calculates a new $TIDX_{MAX}$ depending on the shift |
| | | | If shift down: $TIDX_{MAX} = TIDX_{MAX} − S * G$ |
| | | | If shift up $TIDX_{MAX} = TIDX_{MAX} + S * G$ |
| | | | The condition shall be met that $TIDX_{MAX}$ + G − 1 ≤ StopSubCarrier |
| | | | If the Direction indicates that the BAT values are shifted down, the shift value S indicates that |
| | | | for i = $TIDX_{MIN}$ to $TIDX_{MAX}$ + G − 1 |
| | | | BAT(i) = BAT (i + S * G) |
| | | | If the Direction indicates that the BAT values are shifted up, the shift value S indicates |
| | | | for i = $TIDX_{MAX}$ + G − 1 to S * G |
| | | | BAT(i) = BAT (i − S * G) |
| | | | for i = $TIDX_{MIN}$ to $TIDX_{MIN}$ + S * G − 1 |
| | | | BAT(i) = new value according to the fields B1 to Bn |
| | | | Let X denote the smallest integer larger than or equal to S/2 |
| Reserved | | [6:4] | Reserved by ITU-T (Note 1). |
| Direction | | 7 | Direction of shifting |
| | | | The value 0 indicates that the BAT values are shifted down |
| | | | The value 1 indicates that the BAT values are shifted up |

TABLE 2-continued

Format of CE_ParamShift. req message (version
2 Receiver determines new $TIDX_{MIN}$ and $TIDX_{MAX}$)

| Field | Octet | Bits | Description |
|---|---|---|---|
| $TIDX_{MIN}$ | 3 to 5 | [11:0] | 12-bit unsigned integer indicating the lowest sub-carrier index to which non-zero bits are assigned. It shall be an integer multiple of G (Note 3). |
| $TIDX_{MAX}$ | | [11:0] | 12-bit unsigned integer indicating the highest sub-carrier index to which non-zero bits are assigned. It shall be an integer multiple of G (Note 3) and if bit-loading grouping is used (G > 1) shall meet: TIDXMAX + G − 1 ≤ StopSubCarrier, where StopSubCarrier is specified in Table 8-16.6 ("Bandplan Info Capability Value field). |
| B1 | 6 | [3:0] | 4-bit unsigned integer indicating the number of bits assigned to sub-carrier indices $TIDX_{MIN}$ to $TIDX_{MIN}$ + G − 1 (Note 3). This field only exists if BAT_COMPRESSION field is set to zero AND the direction bit is set to 1 AND S > 0 |
| | | [7:4] | 4-bit unsigned integer indicating the number of bits assigned to sub-carrier indices $TIDX_{MIN}$ + G to $TIDX_{MIN}$ + 2 * G − 1 (Note 3) This field only exists if BAT_COMPRESSION field is set to zero AND the direction bit is set to 1 AND S > 1 |
| ... | ... | ... | |
| Bx | 6 + X | [3:0] | 4-bit unsigned integer indicating the number of bits assigned to sub-carrier indices $TIDX_{MIN}$ + (S − 1) * G to $TIDX_{MIN}$ + S * G − 1 This field only exists if BAT_COMPRESSION field is set to zero AND the direction bit is set to 1 AND S > 2 |
| | | [7:4] | 4-bit unsigned integer indicating the number of bits assigned to sub-carrier indices $TIDX_{MIN}$ + (S − 1) * G to $TIDX_{MIN}$ + S * G − 1 This field only exists if BAT_COMPRESSION field is set to zero AND the direction bit is set to 1 AND S > 3 |

(Note 1)
Bits that are reserved by ITU-T shall be set to zero by the transmitter and ignored by the receiver.
(Note 2)
Sub-carrier index represents the physical index (clause 7.1.4.1 of [ITU-T G.9960]).
(Note 3)
Sub-carrier index represents the physical index (clause 7.1.4.1 of [ITU-T G.9960]). All BAT entries outside [TIDXMIN, TIDXMAX + G − 1] shall be considered as unloaded.

TABLE 3

Format of CE_ParamShift.cnf message

| Field | Octet | Bits | Description |
|---|---|---|---|
| CE_BAT_ID | 0 | [4:0] | This field indicates the BAT_ID specified in the CE_ParamShift.req message |
| Reserved | | [7:5] | Reserved by ITU-T (Note) |
| NUM_AVAIL_BATS | 1 | [4:0] | This field contains the number of available runtime BATs, assuming G = 1, that this node (SID) can support when transmitting to the destination node (DID). It excludes the BAT associated with the CE_BAT_ID. Valid values are from 0 to 23. |
| StatusCode | | [7:5] | 0 - BAT successfully updated<br>1 - Request rejected (no more resources)<br>2 - Request rejected (O_BAT_ID does not exist)<br>3 - Request rejected (N_BAT ID already exist)<br>4 to 7 - Reserved by ITU-T |

(Note)
Bits that are reserved by ITU-T shall be set to zero by the transmitter and ignored by the receiver.

Another extension to the ITU recommendation is to allow the transmitter to dynamically switch-on/off the power of its sub-carriers depending on the bit-loading scheme. By default, all non-masked subcarriers within the band plan are switched-on. This extension allows the transmitter to switch-off the sub-carriers for which the corresponding BAT-entry is set to zero.

Following options can be chosen to switch-on/-off sub-carriers for which the BAT entry is set to zero.
  Sub-channels adjacent to non-zero BAT-entries may be kept on
  Sub-channels non-adjacent to non-zero BAT-entries may be switched-off
  Sub-channels adjacent to non-zero BAT-entries may be switched off, but temporarily switched-on when
    transmitting probe symbols
    transmitting ACE symbols The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. A bit loading control method in a multi-carrier wireless communication system for transferring data on a communication channel, which has a declining channel response with increasing frequency, the bit loading control method comprising:
   sending by an apparatus a request for a test signal;
   receiving by the apparatus the test signal from a remote device;
   obtaining an estimated channel response of the communication channel over a plurality of subcarriers based on the received test signal; and
   determining according to the estimated channel response a bit loading scheme for allocating the plurality of subcarriers into one or more non-overlapping frequency segments, each comprising more than one adjacent subcarrier, and assigning to each of the frequency segments an individual modulation scheme that is shared by the more than one adjacent subcarrier, and wherein the individual shared modulation schemes are assigned in a monotonously reducing modulation order with increasing frequency.

2. The method of claim 1, further comprising:
   updating the bit loading scheme upon detecting a change of the channel response of the communication channel, wherein the update is made by keeping each frequency segment assigned with an individual modulation scheme comprising the same number of subcarriers and shifting the allocation of the frequency segments up or down in frequency according to the change of the channel response.

3. The method of claim 1, further comprising:
   sending the bit loading scheme to the remote device for use by the remote device in communicating with the apparatus over the communication channel.

4. The method according to claim 1, further comprising:
   storing locally the bit loading scheme.

5. The method according to claim 1, wherein the test signal is comprised in either a dedicated probe packet or a dedicated field in a data or management packet.

6. The method according to claim 5, wherein a request for the test signal further comprising parameters related to the dedicated probe packet or the dedicated field in a data or management packet.

7. The method according to claim 1, the bit loading scheme is composed in a format using information comprising at least one of the following representations:
   an index of a lowest subcarrier within each frequency segment, an index of a highest subcarrier in any of the frequency segment;
   an index of a highest subcarrier within each frequency segment, an index of a lowest subcarrier in any of the frequency segment;
   an index of a lowest subcarrier in any of the frequency segment, and a number of subcarriers comprised in each frequency segment listed sequentially according to frequency from low to high;
   an index of a highest subcarrier in any of the frequency segment, and a number of subcarriers comprised in each frequency segment listed sequentially according to frequency from high to low;
   a number of subcarriers comprised in each frequency segment listed sequentially according to frequency from low to high.

8. The method according to claim 1, wherein the individual modulation schemes are implemented with a uniform power loading on each of the frequency segments.

9. A non-transitory computer readable medium comprising instructions which, when the instructions are executed by a bit loading control apparatus comprising a processor, cause the processor to perform the method of claim 1.

10. A bit loading control apparatus for assisting in the transfer of data over a communication channel, which has a declining channel response with increasing frequency, in a multi-carrier wireless communication system, the bit loading control apparatus comprising:
    a transmitter configured to send a request for a test signal;
    a receiver configured to receive the test signal from a remote device;
    a controller configured to:
    obtain an estimated channel response of the communication channel over a plurality of subcarriers based on the received test signal; and
    determine according to the estimated channel response a bit loading scheme for allocating the plurality of subcarriers into one or more non-overlapping frequency segments, each comprising more than one adjacent subcarrier, and assigning to each of the frequency segments an individual modulation scheme that is shared by the more than one adjacent subcarrier, and wherein the individual shared modulation schemes are assigned in a monotonously reducing modulation order with increasing frequency.

11. The bit loading control apparatus of claim 10, the bit loading control apparatus is further configured to perform wireless communication with the remote device in the multi-carrier wireless communication system, wherein the transmitter is further configured to:
  modulate data sent on the one or more adjacent subcarriers belonging to a same frequency segment with a same individual modulation scheme according to the bit loading scheme; and
  transmit the modulated data to the remote device over the communication channel.

12. A multi-carrier wireless communication system with a communication channel having a declining channel response with increasing frequency, the multi-carrier wireless communication system comprising:
  a first transceiver according to the bit loading control apparatus of claim 11 and a remote device, wherein the remote device is configured to receive a bit loading scheme from the first transceiver and to demodulate data received from the first transceiver according to the received bit loading scheme.

13. The bit loading control apparatus of claim 10, the bit loading control apparatus is further configured to perform wireless communication with the remote device in the multi-carrier wireless communication system, wherein the receiver is further configured to:
  receive data from the remote device over the communication channel; and
  demodulate data received on the more than one adjacent subcarrier belonging to a same frequency segment with a same individual modulation scheme according to the bit loading scheme.

14. The bit loading control apparatus of claim 10, wherein the transmitter is further configured to:
  send the bit loading scheme to the remote device for use by the remote device in communication with the bit loading control apparatus.

15. The bit loading control apparatus of claim 10, wherein the communication channel is an optical communication channel, and the bit loading control apparatus further comprises an optical front end configured to connected to the transmitter and the receiver to transmit and receive data on the optical communication channel.

* * * * *